(12) United States Patent
Greenberg

(10) Patent No.: US 9,688,550 B2
(45) Date of Patent: Jun. 27, 2017

(54) ELECTROLYTIC APPARATUS AND METHOD FOR TREATING WATER TO REMOVE NITRATES, PHOSPHATES, ARSENATES, AND MOLECULES OF HIGH MOLECULAR WEIGHT

(75) Inventors: Bernard Greenberg, Huntington, NY (US); Polly Hanson-Greenberg, legal representative, Huntington, NY (US)

(73) Assignee: Aqua Vectors, Incorporated, Halesite, NY (US)

( * ) Notice: Subject to any disclaimer, the term of this patent is extended or adjusted under 35 U.S.C. 154(b) by 675 days.

(21) Appl. No.: 13/816,041

(22) PCT Filed: Aug. 8, 2011
(Under 37 CFR 1.47)

(86) PCT No.: PCT/US2011/046978
§ 371 (c)(1),
(2), (4) Date: Apr. 25, 2013

(87) PCT Pub. No.: WO2013/002813
PCT Pub. Date: Jan. 3, 2013

(65) Prior Publication Data
US 2013/0277231 A1    Oct. 24, 2013

Related U.S. Application Data

(60) Provisional application No. 61/371,926, filed on Aug. 9, 2010, provisional application No. 61/430,264, filed on Jan. 6, 2011.

(51) Int. Cl.
*C02F 1/461* (2006.01)
*C02F 1/463* (2006.01)
(Continued)

(52) U.S. Cl.
CPC ........ *C02F 1/4676* (2013.01); *C02F 1/46104* (2013.01); *C02F 1/46109* (2013.01);
(Continued)

(58) Field of Classification Search
CPC ........... C02F 1/461–1/465; C02F 1/467; C02F 1/4674; C02F 2301/04; C02F 2301/043;
(Continued)

(56) References Cited

U.S. PATENT DOCUMENTS 4,604,170 A * 8/1986 Miyake ................. C08J 5/2281
                                                                204/252
5,183,545 A * 2/1993 Branca et al. ................ 204/252
(Continued)

FOREIGN PATENT DOCUMENTS

KR         10-0492471 B1      5/2005
KR         10-0950729 B1      3/2010

OTHER PUBLICATIONS

Dash, Barada Prasanna et al, "Electrochemical gentrification of simulated ground water," Water Research 39 (2005) 4065-4072.
(Continued)

*Primary Examiner* — Steven A. Friday
(74) *Attorney, Agent, or Firm* — James Marc Leas

(57) ABSTRACT

An apparatus for treating contaminated water includes an electrolytic cell and a flow directing device. The electrolytic cell includes an anode chamber, a cathode chamber, an anode, a cathode, and a membrane. The anode is in the anode chamber and the cathode is in the cathode chamber. The membrane is positioned in the electrolytic cell to maintain a pH difference between the anode chamber and cathode chamber when a voltage is applied between the anode and cathode. The contaminated water for treatment is provided with hydrogen ions at the anode and with hydroxyl ions at the cathode when the voltage is applied. The flow directing
(Continued)

device is connected to direct the water from the anode chamber to the cathode chamber.

31 Claims, 18 Drawing Sheets

(51) Int. Cl.
*C02F 1/467* (2006.01)
*C25B 1/10* (2006.01)
*C02F 101/16* (2006.01)
*C02F 101/20* (2006.01)
*C02F 103/18* (2006.01)

(52) U.S. Cl.
CPC ............... *C25B 1/10* (2013.01); *C02F 1/463* (2013.01); *C02F 2001/46138* (2013.01); *C02F 2001/46142* (2013.01); *C02F 2101/16* (2013.01); *C02F 2101/163* (2013.01); *C02F 2101/20* (2013.01); *C02F 2103/18* (2013.01); *C02F 2201/4611* (2013.01); *C02F 2201/46115* (2013.01); *Y02E 60/366* (2013.01)

(58) Field of Classification Search
CPC ........ C02F 2301/046; C02F 2201/4611; C02F 2201/46115; C25B 1/22; C25B 1/26; C25B 1/46

See application file for complete search history.

(56) References Cited

U.S. PATENT DOCUMENTS

| 5,470,669 | A | | 11/1995 | Ludwig | |
|---|---|---|---|---|---|
| 5,720,869 | A | * | 2/1998 | Yamanaka et al. | 205/742 |
| 5,997,717 | A | * | 12/1999 | Miyashita | C02F 1/4618 204/252 |
| 6,228,251 | B1 | * | 5/2001 | Okazaki | A61L 2/035 204/263 |
| 6,251,259 | B1 | * | 6/2001 | Satoh et al. | 205/744 |
| 6,471,873 | B1 | | 10/2002 | Greenberg | |
| 6,723,226 | B1 | * | 4/2004 | Takayasu | C02F 1/4618 134/902 |
| 7,713,403 | B2 | * | 5/2010 | Kamitani | C02F 1/20 204/263 |
| 2003/0052062 | A1 | * | 3/2003 | Iseki et al. | 210/748 |
| 2003/0070940 | A1 | * | 4/2003 | Hirayama et al. | 205/746 |
| 2003/0164308 | A1 | * | 9/2003 | Schlager | C02F 1/4672 205/701 |
| 2003/0168411 | A1 | * | 9/2003 | Hiro | C02F 1/463 210/748.2 |
| 2005/0126928 | A1 | * | 6/2005 | Hung et al. | 205/746 |
| 2007/0108056 | A1 | * | 5/2007 | Nyberg et al. | 204/554 |

OTHER PUBLICATIONS

Harrison, Jeffrey B et al, "Anion Interactions with Freshly Prepared Hydrous Iron Oxides," Clays and Clay Minerals, vol. 30, No. 2, 97-102, 1982.
PCT International Search Report Jan. 2, 2013.

* cited by examiner

| | PROCESS FOR REMOVAL OF ORGANIC MATERIALS BY PROTONATION OF PROTEINS |
|---|---|
| Step 1 | Water flows into the Anode Chamber, with organic material in it: proteins, protein fragments, etc. The Anode causes intense acidification of the Water (pH of approx. 2) by the release of Hydrogen ions (protons).<br><br>$2H_2O = 4H^+ + O_{2(g)} + 4e^-$ |
| Step 2 | The Hydrogen ions (protons) serve as a catalyst to protonate the various proteins of those organic materials in two simultaneous ways: (a) cleaving the peptide bonds that hold the amino acid residues together in the chains (primary structure) that form proteins, reducing the proteins to fragments or amino acids, and (b) breaking the hydrogen bonds in the secondary structure that gives proteins their configuration or shape.<br><br>A. CHANGE TO PRIMARY STRUCTURE:<br>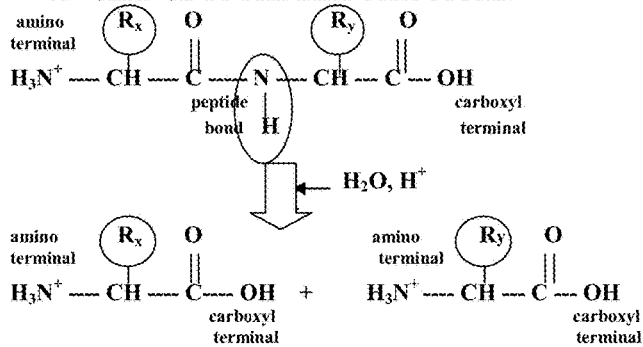<br>In this illustration, the peptide bond forming a simple protein of two amino acids is cleaved, leaving two amino acids.<br><br>B. CHANGE TO SECONDARY STRUCTURE:<br>When pH is lowered substantially, the protein turns highly positive, leading to intramolecular repulsion great enough to break the weak hydrogen bonds in the protein's secondary structure and cause unfolding of the protein. The unfolding exposes hydrophobic groups and causes aggregation. 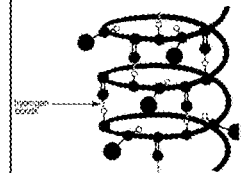<br><br>These alterations irreversibly disrupt the protein structure, inactivating both biological and mechanical properties. The resultant material forms insoluble coagulates that are lighter than water, thus rising to the surface of the water, assisted by the oxygen bubbles formed in Step 1. |

FIG. 16

| | PROCESS FOR BREAKING BONDS OF SUGAR-PHOSPHATE RIBBONS IN BACTERIAL DNA |
|---|---|
| Step 1 | Water flows into the Anode Chamber, with bacterial material in it. The Anode causes intense acidification of the Water (pH of approx. 2) by the release of Hydrogen ions ($H^+$). $$2H_2O = 4H^+ + O_{2(g)} + 4e^-$$ |
| Step 2 | The Hydrogen ions "attack" the negatively charged Phosphate links in the sugar-phosphate backbone (ribbons) in the DNA of the bacterial matter, cleaving the electrically-induced bonds between the sugars and the phosphates and breaking the backbone into fragments. 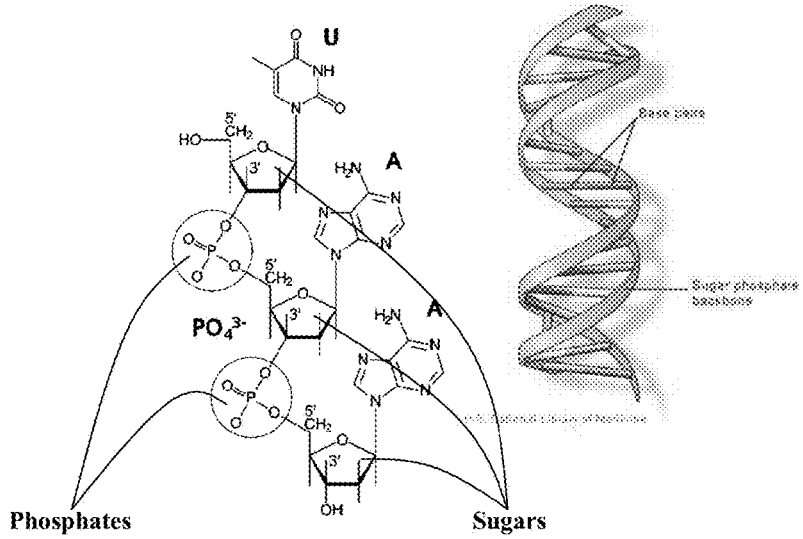 Once the bonds have been broken, the phosphates and sugars are released into the water and carried on into the holding tank and the Cathode Chamber. |

FIG. 17

ELECTROLYTIC APPARATUS AND METHOD FOR TREATING WATER TO REMOVE NITRATES, PHOSPHATES, ARSENATES, AND MOLECULES OF HIGH MOLECULAR WEIGHT

RELATED APPLICATIONS AND PRIORITY

This application claims priority of Provisional Patent Application 61/371,926, filed Aug. 9, 2010 and Provisional Patent Application 61/430,264, filed Jan. 6, 2011, both of which are incorporated herein by reference.

FIELD

This patent application generally relates to techniques for treating and purifying contaminated water. More particularly, this patent application is related to electrolytic techniques for removing nitrates, phosphates and other negative ions, arsenic, molecules of high molecular weight, and organic materials, such as proteinaceous materials, from water.

BACKGROUND

Conventionally bio-oxidative techniques, such as bubbling air through contaminated water containing bacteria, have been used for digesting contaminants and for treating and purifying contaminated water such as sanitary waste water, drinking water and ground water. Bio-oxidative purification techniques occur slowly and require a large area footprint to treat significant volumes of water. These techniques also produce foul odors that affect neighboring property owners and generate large quantities of sludge as a byproduct. That sludge can be hazardous to human health and to the environment, containing heavy metals, toxins and bacteria that require further processing and treatment before the sludge can be hauled off site for disposal. The process is inherently energy-inefficient, since it requires continuously pumping volumes of atmospheric air into the treatment pools, most of which is nitrogen and therefore of no use to the oxidation process. Further, rates of bio-oxidation are sensitive to temperature and thus materially slower in colder weather. Thus, biooxidation suffers from a large footprint, long process time, foul odors, energy inefficiency, sludge disposal, and cost issues.

Non-biological processes for treating water have also been employed. Chemical treatment has included addition of coagulants, flocculants, adsorbants, filter aids and oxidants. Radiation from ultra-violet and nuclear sources, and physical treatments, such as air flotation, filtration, centrifuging, various types of osmosis, and ozone treatment have also been used. These approaches are expensive and time consuming and have not been widely adopted.

More recently electrolytic treatment of contaminated water has been proposed by Greenburg, et al. in U.S. Pat. No. 6,471,873 ("the '873 patent"), incorporated herein by reference. The '873 patent describes an electrolytic cell having an anode chamber and cathode chamber separated by a membrane of submicron porosity. An electric current is applied through the cell. Contaminated water is fed into the cathode chamber, then into a holding tank, and then into the anode chamber. At the cathode electrically driven reactions occur to bring about the agglomeration of colloidal particles which can then be filtered out. At the anode, high current densities facilitate the oxidation of ammonia to nitrogen gas and produce chloric acid to oxidize any residual soluble organic material and act germicidally. While the electrolytic treatment described in the '873 patent can be carried out on a smaller footprint, produce fewer odors, consume less energy, and greatly reduce sludge byproduct, further improvement is needed to reduce the amount of electricity used, extend the life of the electrodes, eliminate the production of chlorine gas, and reduce costs, and these improvements are provided by the present patent application.

SUMMARY

One aspect of the present patent application is an apparatus for treating contaminated water, comprising an electrolytic cell and a flow directing device. The electrolytic cell includes an anode chamber, a cathode chamber, an anode, a cathode, and a membrane. The anode is in the anode chamber and the cathode is in the cathode chamber. The membrane is positioned in the electrolytic cell to maintain a pH difference between the anode chamber and cathode chamber when a voltage is applied between the anode and cathode. The contaminated water for treatment is provided with hydrogen ions at the anode and with hydroxyl ions at the cathode when the voltage is applied. The flow directing device is connected to direct the water from the anode chamber to the cathode chamber.

Another aspect of the present patent application is an apparatus for treating contaminated water. The apparatus includes an electrolytic cell and a flow directing device. The electrolytic cell includes an anode chamber containing an anode, a cathode chamber containing a cathode, and a membrane separating the anode chamber and the cathode chamber. Hydrogen ions are electrically generated in the water for treatment at the anode and hydroxyl ions are generated in the water for treatment at the cathode when a voltage is provided between the anode and the cathode. The anode chamber includes an anode chamber inflow and the cathode chamber includes a cathode chamber outflow. The water for treatment enters the anode chamber at the anode chamber inflow. The flow directing device directs the water for treatment containing the electrically generated hydrogen ions from the anode chamber for stimulating reactions that remove unwanted material from the water for treatment while providing cleaned water from the cathode chamber outflow having a pH substantially the same as water entering the anode chamber inflow.

Another aspect of the present patent application is a method of reducing negative ion species in water. The method includes providing an electrolytic cell that includes an anode chamber, a cathode chamber, and a membrane there between. The anode chamber includes an anode and the cathode chamber includes a cathode. The cathode has a surface capable of catalyzing reaction of the negative ion species with hydrogen ions and with electrons provided from the cathode. Water containing the negative ion species is directed into the anode chamber and then into the cathode chamber. A voltage is provided between the anode and the cathode sufficient to electrically generate hydrogen ions in the water at the anode and hydroxyl ions in the water at the cathode. The membrane maintains a pH difference between the anode chamber and cathode chamber. The water directed from the anode chamber includes the electrically generated hydrogen ions. The cathode surface is used for catalyzing reaction of the negative ion species with the electrically generated hydrogen ions and with electrons from the cathode to reduce the negative ion species and to substantially remove the negative ion species from the water.

Another aspect of the present patent application is a method of treating water. The method includes providing water for treatment, wherein the water contains at least one contaminant material from the group consisting of nitrates, phosphates, arsenates, and a high molecular weight material contaminant, wherein the high molecular weight material has a molecular weight equal to or greater than 200. The method also includes providing a source of metal. In the method, an electrode having a positive voltage reacts with the water for treatment to provide hydrogen ions in the water for treatment, wherein the hydrogen ions react with the metal to form metal ions. The method also includes providing an electrode having a negative voltage to react with water to form hydroxyl ions, wherein the hydroxyl ions react with the metal ions to form at least one from the group consisting of a metal hydroxide and a metal hydrous oxide which is used to agglomerate the contaminant material. The method also includes filtering the agglomerated material out of the water.

Another aspect of the present patent application is a method of removing a material from water. The method includes providing the water for treatment, wherein the water contains a material, wherein the water for treatment has an entering pH. The method also includes providing a metal, reacting the metal to provide metal ions, reacting the metal ions to provide a metal hydrous oxide, and agglomerating the material with the metal hydrous oxide. The method also includes releasing the water with the material agglomerated on the metal hydrous oxide wherein the released water has a pH substantially equal to the pH of the water for treatment.

Another aspect of the present patent application is a method of removing a nitrate ion contaminant from water. The method includes providing a first electrolytic cell that includes a first chamber, a second chamber, and a membrane there between. The first chamber includes a first electrode the second chamber includes a second electrode. The first electrode has a valve metal surface. The method further includes providing a voltage between the first electrode and the second electrode. The first electrode has a voltage that is negative with respect to the second electrode. The voltage difference provides a pH difference across the membrane without addition of acidic or basic materials. The method further includes reacting nitrate ions in the water on the valve metal surface to reduce nitrate ion concentration and evolving nitrogen gas without agglomeration of particles in the first chamber.

Another aspect of the present patent application is a method of removing a contaminant from water. The method includes providing an electrolytic cell that includes an anode chamber, a cathode chamber, and a membrane there between, wherein the anode chamber includes an anode and wherein the cathode chamber includes a cathode. The method further includes directing the water containing the contaminant into the anode chamber, wherein the water entering the anode chamber has an entering pH. The method also includes directing the water from the anode chamber to the cathode chamber. The method also includes providing a voltage between the anode and the cathode sufficient to electrically generate hydrogen ions in the water at the anode and hydroxyl ions in the water at the cathode, wherein the membrane maintains a pH difference between the anode chamber and the cathode chamber and wherein the water directed from the anode chamber includes the electrically generated hydrogen ions providing an acidic pH. The method also includes providing a reaction with the hydrogen ions for rendering the contaminant removable from the water and providing a reaction with the hydrogen ions before the water leaves the cathode chamber wherein the water exiting the cathode chamber has an exiting pH, wherein the exiting pH is about equal to the entering pH.

Another aspect of the present patent application is a method of removing a contaminant from water. The method includes providing an electrolytic cell that includes an anode chamber, a cathode chamber, and a membrane there between, wherein the anode chamber includes an anode and wherein the cathode chamber includes a cathode. The method further includes directing the water containing the contaminant into the anode chamber and directing the water from the anode chamber to the cathode chamber. The method also includes providing a voltage between the anode and the cathode sufficient to electrically generate hydrogen ions in the water at the anode and hydroxyl ions in the water at the cathode, wherein the membrane maintains a pH difference between the anode chamber and the cathode chamber and wherein the water directed from the anode chamber includes the electrically generated hydrogen ions providing an acidic pH. The method also includes reacting the contaminant in the acidic pH to cause the contaminant to break into fragments. The method also includes neutralizing the acid before the water leaves the cathode chamber.

BRIEF DESCRIPTION OF DRAWINGS

The foregoing and other aspects and advantages of the invention will be apparent from the following detailed description as illustrated in the accompanying drawings, in which:

FIG. 16 is a flow chart illustrating an embodiment of a process for removing organic materials by protonation of proteins;

FIG. 17 is a flow chart illustrating an embodiment of a process for breaking bonds of sugar-phosphate ribbons in the DNA of bacteria and other micro-organisms.

DETAILED DESCRIPTION

Figure 1A:
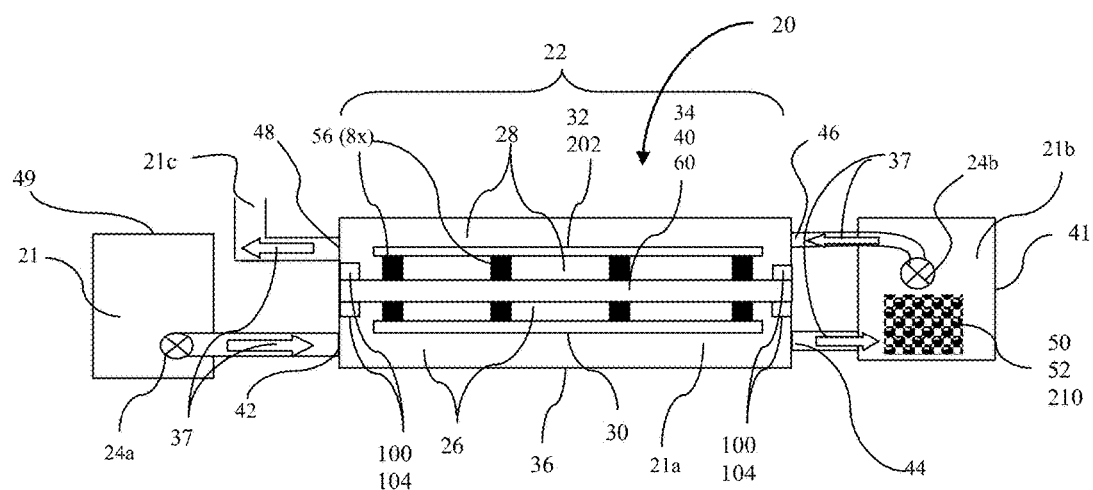
FIG. 1a is a top schematic view of one embodiment of an electrolytic cell configuration.

Electrolytic system 20 illustrates an embodiment of a system to treat contaminated water 21, as shown in FIG. 1a. The electrolytic system 20 may be used to remove negative ion species, such as nitrates and phosphates. It may also be used to remove molecules of high molecular weight from contaminated water. It may also be used to remove arsenic and such biological materials as bacteria, proteins and DNA.

Electrolytic system 20 includes electrolytic cell 22 which includes anode chamber 26, cathode chamber 28, anode 30, cathode 32 and membrane 34, all enclosed in containment tank 36, as shown in FIGS. 1a, 1b and 2a, 2b. Anode 30 resides within anode chamber 26. Cathode 32 resides within cathode chamber 28. Membrane 34 is located within electrolytic cell 22 between anode chamber 26 and cathode chamber 28. Membrane 34 is positioned in electrolytic cell 22 to maintain a pH difference between anode chamber 26 and cathode chamber 28 when a voltage is applied between anode 30 and cathode 32. Membrane 34 is supported by membrane assembly 40. Membrane 34 and membrane assembly 40 define the boundary between anode chamber 26 and cathode chamber 28. In one embodiment, electrolytic cell 22 is open to the atmosphere, facilitating fluid flow and equal pressures and water levels in cathode and anode chambers and venting of gases produced in the process.

In one embodiment, electrolytic cell containment tank 36 and associated inlet and outlet piping, valves, and tanks, are made of a highly inert material, such as polypropylene. They may also be made of other thermoplastics.

Figure 1B:
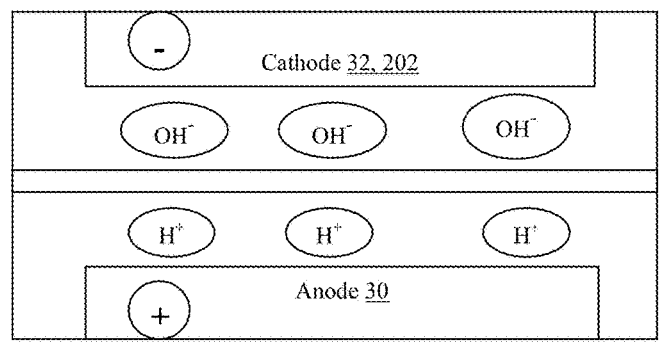
FIG. 1b is a top view of the embodiment of FIG. 1a schematically showing generation of hydrogen ions at the anode and hydroxyl ions at the cathode.

Contaminated water 21 for treatment is provided with hydrogen ions at anode 30 and hydroxyl ions at cathode 32 when a voltage is applied, as shown in FIG. 1b. Thus, contaminated water 21 is electrolytically made acidic in the anode chamber and basic in the cathode chamber. Flow directing device 24b is connected to direct acidic contaminated water 21a from anode chamber 26 to holding tank 41 and then to cathode chamber 28, as shown by flow direction arrows 37. As the number of hydrogen ions generated in the anode chamber equals the number of hydroxyl ions generated in the cathode chamber the water emerging from cathode chamber 28 has a pH equal to that of the water that entered the anode chamber.

Figure 3:
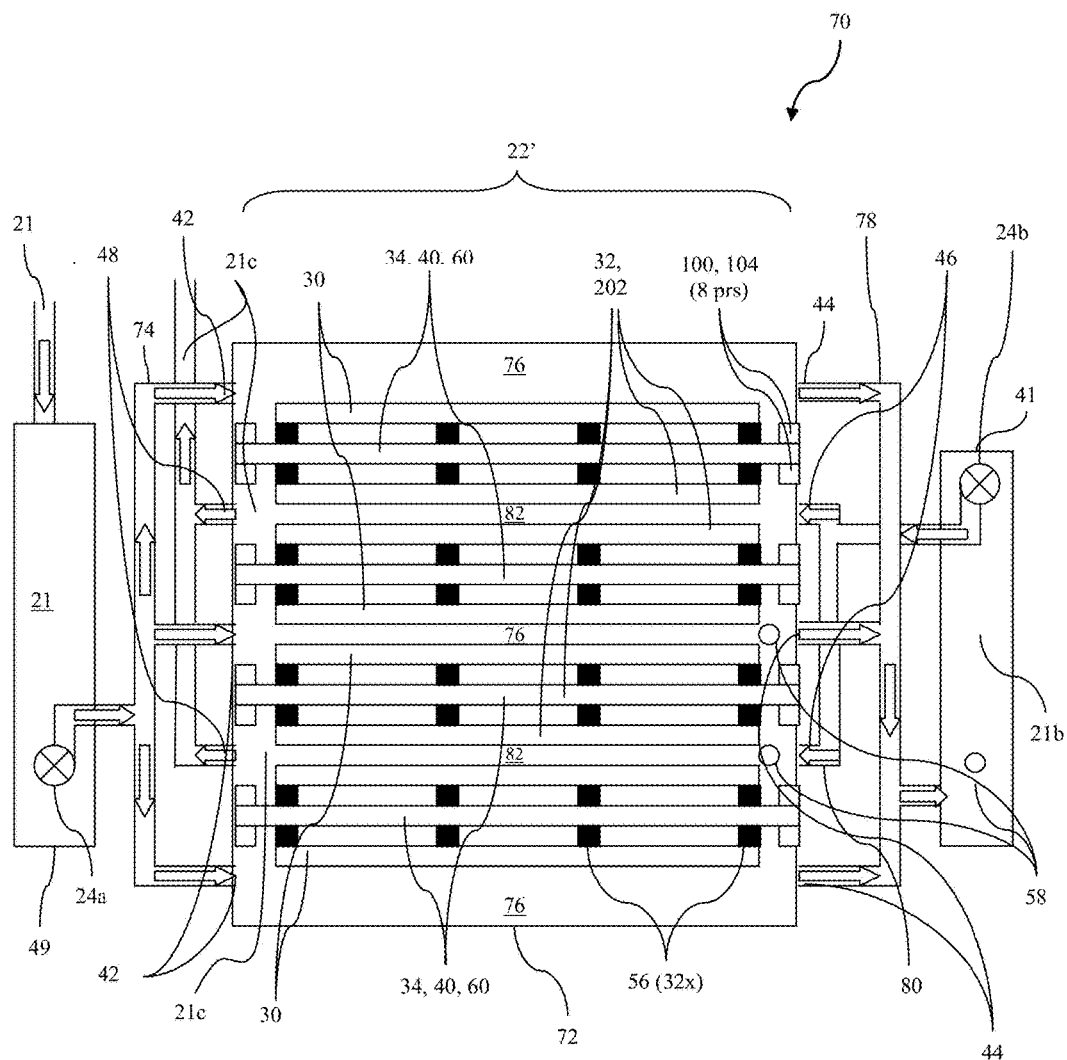
FIG. 3 is a top schematic view illustrating an embodiment in which the electrolytic cell of FIG. 1a is scaled up to have a plurality of anodes, cathodes and membranes to increase water purification capacity.

Electrolytic system 20 may include just a single electrolytic cell 22, as shown in FIG. 1a or it may include multiple electrolytic cells 22', as shown in FIG. 3. Anode chamber 26 includes anode chamber inlet 42 and anode chamber outlet 44. Cathode chamber 28 includes cathode chamber inlet 46 and cathode chamber outlet 48. At least one flow directing device 24a, 24b is provided in cooperation with electrolytic cell 22 to move water into and through electrolytic system 20. Flow directing device 24a, 24b may be a pump. Alternatively, flow directing device 24a may be a flow mechanism that works by gravity feed.

Contaminated water 21 for treatment in electrolytic system 20 may enter and be held in inlet reservoir 49, as shown in FIG. 1a. Contaminated water 21 then flows through anode chamber inlet 42 and enters anode chamber 26. In anode chamber 26 some of the water reacts at anode 30 to produce hydrogen ions that acidify contaminated water 21, as shown in FIG. 1b. Acidified contaminated water 21a exits anode chamber 26 through anode chamber outlet 44 and is directed to enter holding tank 41 which is provided inline between anode chamber outlet 44 and cathode chamber inlet 46. In certain embodiments, filter 47 is used in between anode chamber outlet 44 and holding tank 41 to remove certain by-products of reactions in anode chamber 26 that could interfere with reactions that occur in holding tank 41 and/or in cathode chamber 28, as further described herein below and illustrated in FIG. 11b. Holding tank 41 and flow directing device 24b aid in equalizing the contaminated water level between anode chamber 26 and cathode chamber 28. With equalized water levels fluids on both sides of membrane 34 will be at equal pressure and the only force driving material across membrane 34 will be concentration gradients.

In one embodiment, a metal, such as metallic aluminum 50 or metallic iron 52 is provided in holding tank 41, and acidified contaminated water 21a from anode chamber 26 dissolves some of metallic aluminum 50 or metallic iron 52, providing aluminum ions or iron ions in contaminated water 21b.

Figure 11A:
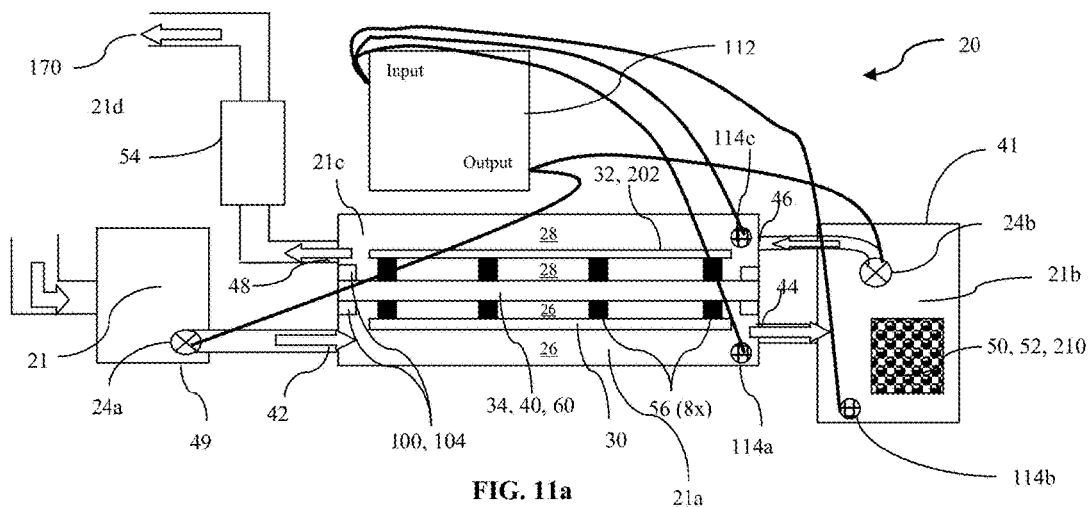
FIG. 11a is a top schematic view illustrating an embodiment of a system incorporating the electrolytic cells of either FIG. 1 or 3 and for removing molecules of high molecular weight from contaminated water.

In the embodiment with aluminum 50, aluminum ion containing contaminated water 21b is then treated in cathode chamber 28 to remove negative ion species, such as nitrates, and to agglomerate molecules of high molecular weight and other negative ion species, such as phosphates and chlorides, that may have been present in entering contaminated water 21, as shown in FIG. 11a. The high molecular weight material, phosphates, chlorides, and other unwanted species agglomerate onto aluminum hydroxide particles that form in cathode chamber 28 from the dissolved aluminum ions reacting with hydroxyl ions formed at cathode 32. Agglomerated particle containing water 21c then exits cathode chamber 28 through cathode chamber outlet 48. The phosphates, chlorides, and high molecular weight particles agglomerated on aluminum hydroxide particles are then filtered out of the aqueous stream, to provide a discharge of cleaned water 21d.

Figure 2A:
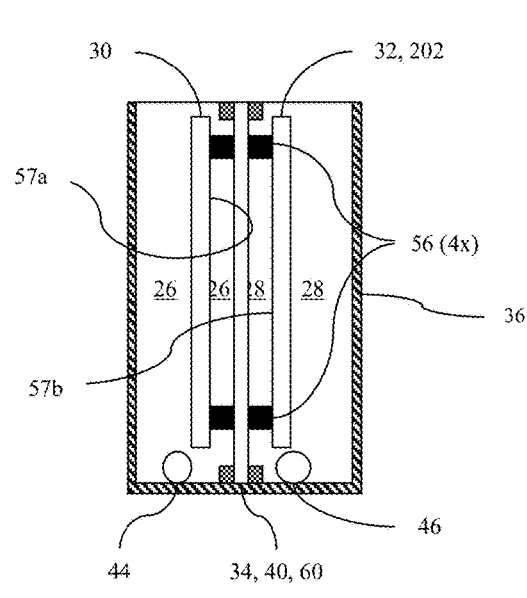
FIG. 2a is an end sectional schematic view of one embodiment of the electrolytic cell configuration in FIG. 1a illustrating a vertical array arrangement for the anode, cathode and membrane.
Figure 2B:
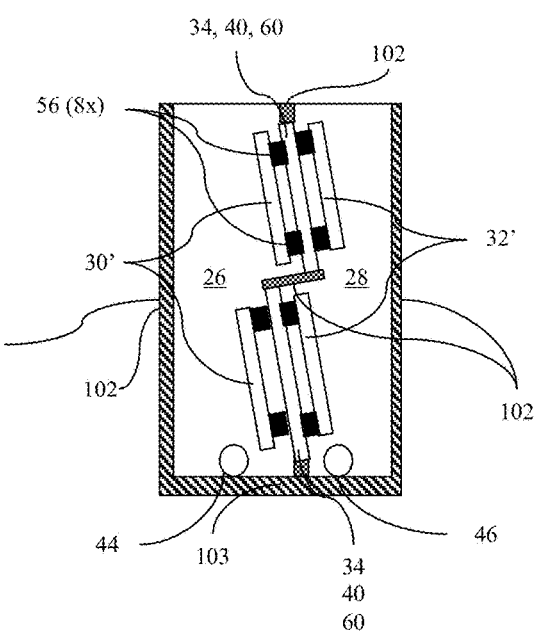
FIG. 2b is an end sectional schematic view of another embodiment of the electrolytic cell configuration in FIG. 1a illustrating a split and tilted array arrangement for the anode, cathode and membrane.

Alternative configurations for anode 30, cathode 32 and membrane 34 are shown in FIGS. 2a and 2b. In one embodiment, a fixed, uniform distance is provided between surface 57a of anode 30 and surface 57b of cathode 32, as conductivity between anode 30 and cathode 32 is directly proportional to the distance between them. In one embodiment, anode 30 and cathode 32 are mounted about an inch apart. This space between anode 30 and cathode 32 may be set by dielectric spacers 56, which span between anode 30 and membrane frame 60 and between cathode 32 and membrane frame 60. The exact number, form and location of spacers 56 may vary by design.

In one embodiment, anode 30', cathode 32' and membrane 34 are oriented tilted from the vertical, as shown in FIG. 2b. The tilted array allows acceleration of fluids as impelled by hydrogen bubbles rising in contaminated water 21b across the surface of cathode 32'. The array structure may include two, five, ten, or any other number of anode and cathode plates.

In one embodiment, electrolytic system 20 includes multiple electrolytic cells 22 arranged in parallel to process larger volumes of contaminated water. One way to accomplish this is to provide multiple electrolytic cells 22 of FIG. 1a and to provide plumbing that divides the incoming stream of contaminated water so a portion goes to each cell 22. Each cell can have its own holding tank 41 as shown in FIG. 1a. Alternatively the discharges from all the anode chambers 26 can be combined in a single holding tank. Plumbing can also combine the discharges of water from each of the separate cathode chambers to provide a single discharge.

Level sensors 58 may be positioned on each side of membrane 34. A controller can use output of level sensors 58 to control operation of flow directing device 24a, 24b to ensure that water level on each side of membrane 34 is the same.

In another embodiment, the multiple electrolytic cells 70 are included in one container 72, as shown in FIG. 3. In one embodiment of this approach each of electrolytic cells 70 is 4-feet wide, 12-feet long and 8-feet high. These dimensions may be varied substantially without impacting the effectiveness of the system. Source of contaminated water 21 is connected through intake reservoir 49 to multiple electrolytic cells 70. Plumbing 74 divides incoming stream of contaminated water 21 so a portion of contaminated water 21 goes to each anode chamber 76 of the four cells 70 illustratively shown in FIG. 3. More or fewer cells can be included in such a multiple electrolytic cell. In this example, plumbing 78 from the four cells combines the flow from the three anode chamber outlets to single holding tank 41. Plumbing 80 divides outflow from single holding tank 41 so a portion goes to each cathode chamber 82 of the four electrolytic cells 70.

The four electrolytic cells 70 are arranged so anode chamber 76 of one cell is adjacent anode chamber 76 of the next cell and cathode chamber 82 of one cell is adjacent cathode chamber 82 of the next cell. Thus, cells 70 each have their own membrane 34 but cells 70 share anode chambers 76 and share cathode chambers 82. In another embodiment, adjacent cells could share anode 30 and cathode 32, 202, substantially reducing the number of electrode plates in electrolytic cell 22'.

A single level sensor 58 may be positioned on each side of one membrane 34 of the multiple cell arrangement of FIG. 3 since the level in all anode chambers 76 should be the same and the level in all cathode chambers 82 should be the same. As with the single cell shown in FIG. 1a, a controller can use output of level sensor 58 to control operation of flow directing device 24a, 24b to ensure that level on each side of membrane 34 is the same.

Figure 4:
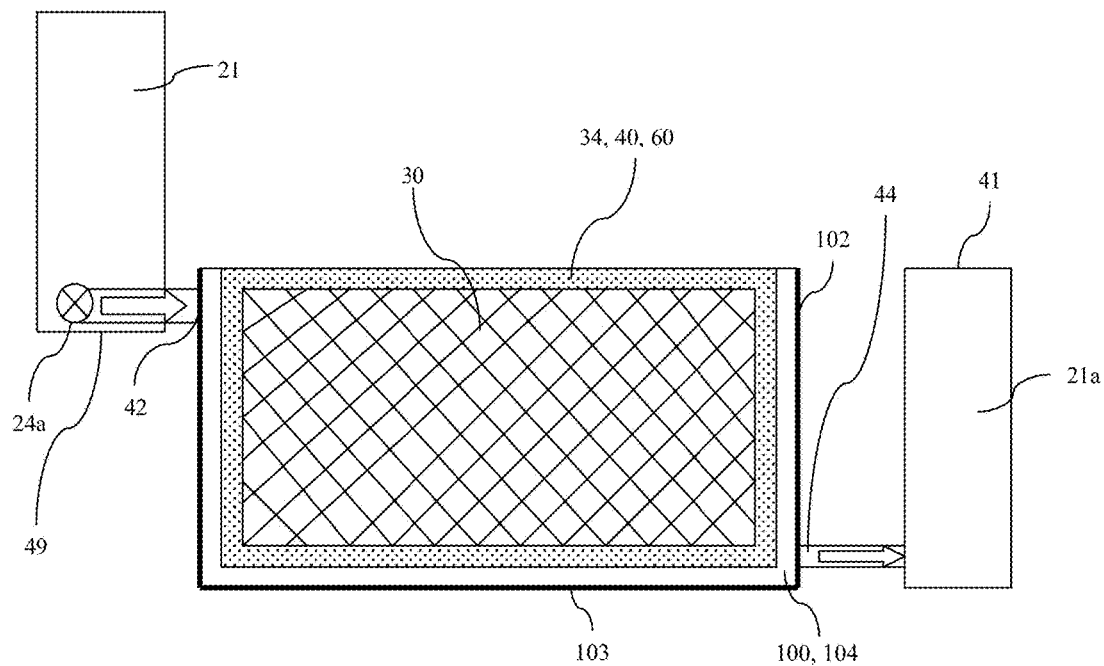
FIG. 4 is a side sectional schematic view showing a more detailed view of the anode chamber configuration of FIGS. 1a and 3.

In one embodiment, anode chamber inlet 42 provides contaminated water 21 entering from the top of anode chamber 26 and anode chamber outlet 44 provides contaminated water 21 exiting at the bottom of the anode chamber 26, as shown in FIG. 4. In one embodiment, cathode chamber 32 provides contaminated water 21 entering through cathode chamber inlet 46 at the bottom of cathode chamber 32 and contaminated water 21 exiting cathode chamber outlet 48 from the top of the cathode chamber 32, as shown in FIG. 5.

A more detailed illustration of the configuration of anode 30 in anode chamber 26 is shown in FIG. 4. This anode configuration is common for both the single cell design of FIG. 1a and the multi-cell design of FIG. 3; however, the exact sizing, shape and orientation may be different depending on the exact electrolytic cell design. Anode 30 may be formed from expanded metal, a metal structure similar to a screen, as a way of mitigating cost; however, from a functional standpoint anode 30 may also be a solid piece. Anode 30 may be fabricated of titanium (Ti) with an outer surface layer of sputtered iridium oxide ($IrO_2$). The use of $IrO_2$ favors the release of oxygen from oxygenated species, such as water, and disfavors the release of chlorine from chloride ions in the water. The iridium oxide acts as a catalyst, lowering the barrier to the reaction of oxygenated species without lowering the barrier to the reaction of chloride ions. However, if the current density at anode 30 is sufficiently high, this will facilitate reaching or exceeding the barrier height of chloride ions and generating chlorine gas. This current density is 5 amps/ft$^2$. Regulating the power supply to under 5 amps/ft$^2$ avoids chlorine gas production. The length and width of each individual titanium anode with the iridium oxide coating may vary. In one embodiment, the thickness is 0.030"-0.040," a thickness that is available as a standard commercial product.

Figure 5:
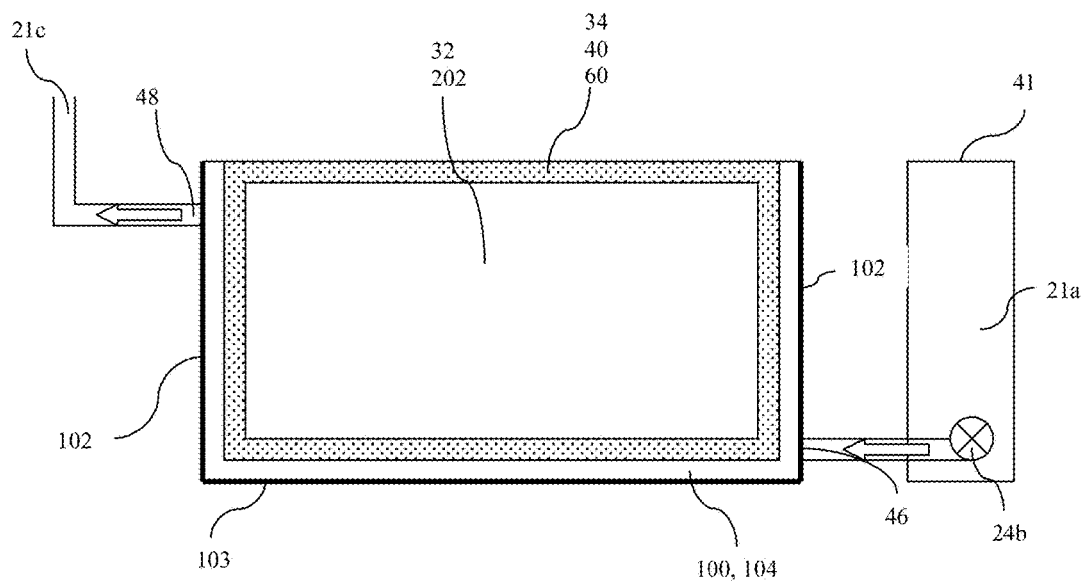
FIG. 5 is a side sectional schematic view showing a more detailed view of the cathode chamber configuration of FIGS. 1a and 3.

A more detailed illustration of the configuration of cathode 32 in cathode chamber 28 is shown in FIG. 5. This cathode configuration is common to both the single cell design of FIG. 1a and the multi-cell design of FIG. 3. While a rectangular shape is shown, the exact sizing, shape and orientation may be different depending on the exact electrolytic cell design. Cathode 32 is mounted so there will be sufficient clearance over the top and under the bottom of the cathode so that contaminated water 21b may circulate freely.

In one embodiment in which nitrate ions are to be reduced to nitrogen gas by introducing contaminated water 21 into cathode chamber 28 first, cathode 32 is a plate having a surface that includes a metal such as titanium, yttrium, zirconium, hafnium, niobium, tantalum, aluminum and tungsten. These metals are known as "valve metals." When a cathode plate formed from one or more of the valve metals is subjected to air oxidation, the valve metal builds up an irreducible oxide coating on the metal surface of the plate.

Particularly for titanium this oxide has a structure that facilitates reduction of nitrates to nitrogen gas and water and inhibits competing reactions.

In one embodiment, cathode 32 is made of titanium 0.030 to 0.040 inches in thickness, a thickness that is available as a standard commercial product. The titanium is air oxidized at 600° C. for ten minutes and then allowed to air cool to provide a uniform surface layer of titanium dioxide ($TiO_2$) across the entire cathode. The length and width of each individual cathode may vary. In other embodiments, cathode 32 is fabricated of a metal, such as copper, steel, monel, and stainless steel with a thickness in the range of 0.030 to 0.040 inches. In one embodiment, anode and cathode were both rectangular with the same dimensions. Spacing was 1 inch between anode 30 and cathode 32, and membrane 34 was half way in between. Anode 30 was fabricated of titanium and cathode 32 was fabricated of stainless steel, each with a thickness of 0.032 inches and assembled as four uniform sized rectangular pieces aggregating 36 inches in length and 26 inches in width. Dimensions for cathode can be different from dimensions of anode and dimensions can be scaled for particular applications.

Figures 6A, 6B:
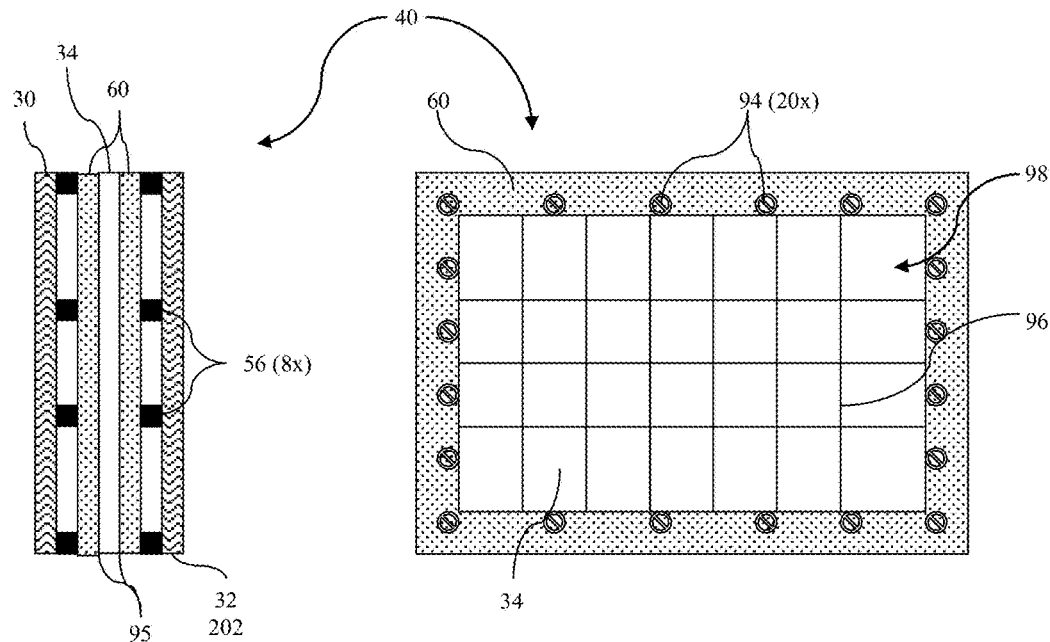
FIG. 6a is an end sectional schematic view showing the membrane assembly configuration of FIGS. 1a and 2-5.
FIG. 6b is a side sectional schematic view showing the membrane assembly configuration of FIGS. 1a and 2-5.

A more detailed illustration of the configuration of membrane 34 and membrane assembly 40 is shown in FIGS. 6a and 6b. This membrane configuration is common to both the single cell design of FIG. 1a and the multi-cell design of FIG. 3. While a rectangular shape is shown the exact sizing, shape and orientation may be different depending on the shape of the exact electrolytic cell. In one embodiment, membrane 34 separating anode chamber 26 and cathode chamber 28 has a pore size of 0.5 micron +/−5% a structure that is suitable to allow conductivity-driven transfers of ionic species in the water including Cat, $Mg^{2+}$, $SO_4^{2-}$, $HCO_3^-$, $CO_3^{2-}$, $Fe^{3+}$, etc. allowing electrical neutrality while preventing un-ionized contaminated water 21 and particulates from passing through the membrane's pores. $H^+$ and $OH^-$ are generated at the electrodes much faster than these species transit through the membrane, allowing the pH difference to develop without the addition of acidic or basic materials.

In one embodiment, membrane 34 has a pore size that is sufficiently large to allow electrically driven ion transfer, but sufficiently small to maintain the required pH difference. In one embodiment, the porous material of membrane 34 has pores with an average pore size of less than one micron, for example, pore size of about 0.5 microns. The average pore size is determined by using a standard bubble point measurement technique. Pore sizes other than 0.5 micron, with a variation in size of about +/−5%, equivalent to variation of +/−0.025 microns, can be used. For example, membrane 34 can have pores with an average pore size in the range from 0.5 to 10 micrometers with a variation of +/−5% of the average pore size. Larger pore sizes, such as up to 50 micrometers, might also be used for some applications. One material that can be used for membrane 34 is polytetrafluoroethylene (PTFE). PTFE is chemically inert to the species contained within the water to be treated and can be fabricated with the desired pore size and distribution. Gore-Tex® film, manufactured by W. L. Gore and Associates, is one porous material for membrane 34 that can be used. Number 2 Goreselect® and Primera® are commercial products that can be used.

Membrane 34 is supported between two halves of membrane frame 60 that are fastened together by fasteners 94, as shown in FIG. 6b. Gasket material 95, fabricated of a material such as neoprene, that is chemically resistant or impervious to the chemistry and range of pH levels of the contaminated water, may be sandwiched between membrane 34 and the halves of membrane frame 60 to ensure a proper seal, as shown in FIG. 6a. Membrane frame 60 is made of polypropylene or another thermoplastic material that is impervious to the range of pH that it is subjected to. A lattice structure of polypropylene slats 96 helps reinforce membrane 34 within window 98 of membrane frame 60.

Figure 7:
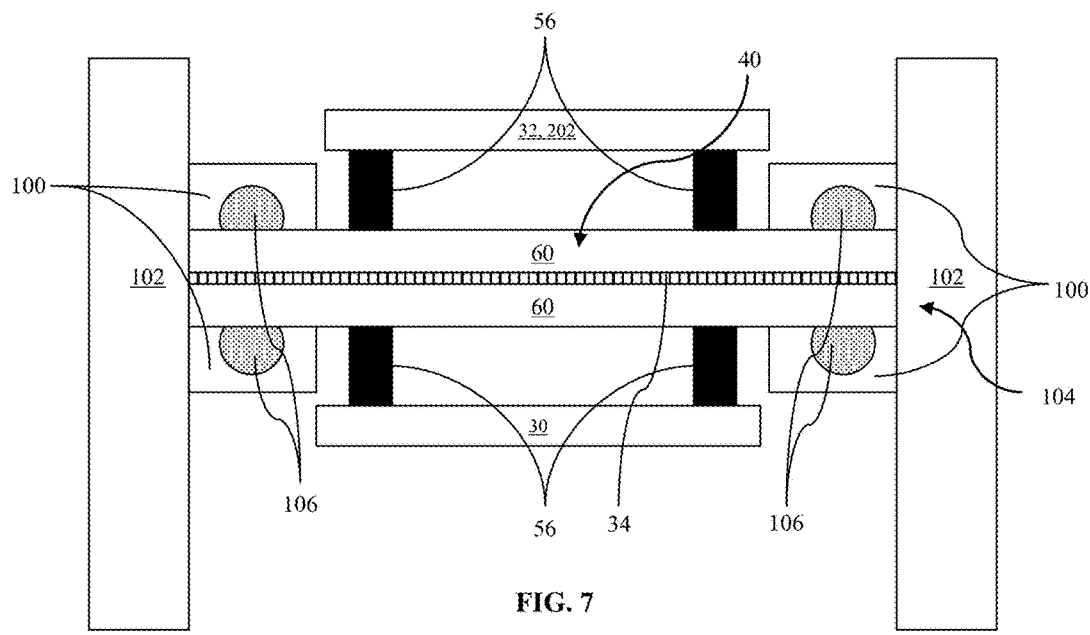
FIG. 7 is a top sectional schematic view of the channel structure for holding membrane assemblies of FIGS. 1a and 2-5.

FIG. 7 shows how each end of membrane frame assembly 40 is supported within containment tank 36. Support elements 100 on containment tank walls 102 and containment tank bottom 103, as shown in FIGS. 4, 5, and 7, create channel 104 extending down both sides of containment tank 36 and across the bottom of the tank. Within channel 104 are one or more sealing elements, such as O-ring gasket 106. Membrane frame assembly 40 is inserted to slide into slot 104 which holds membrane frame assembly 40 and forms a seal by compressing sealing elements 106. Other configurations are possible.

Figure 8:
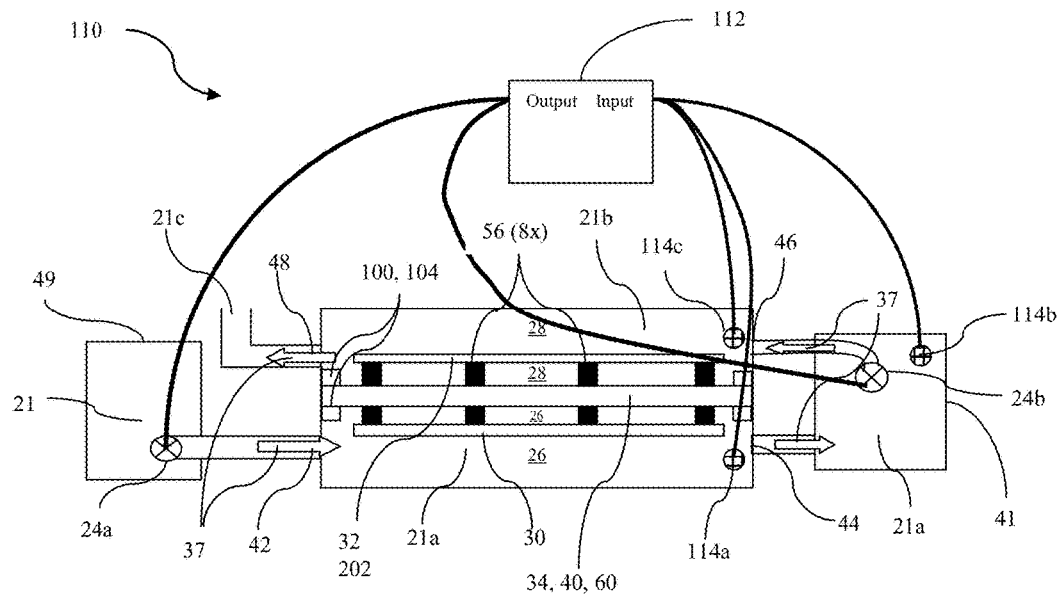
FIG. 8 is a top schematic view of the membrane pressure control system used in conjunction with electrolytic cells of the present patent application.
Figure 9:
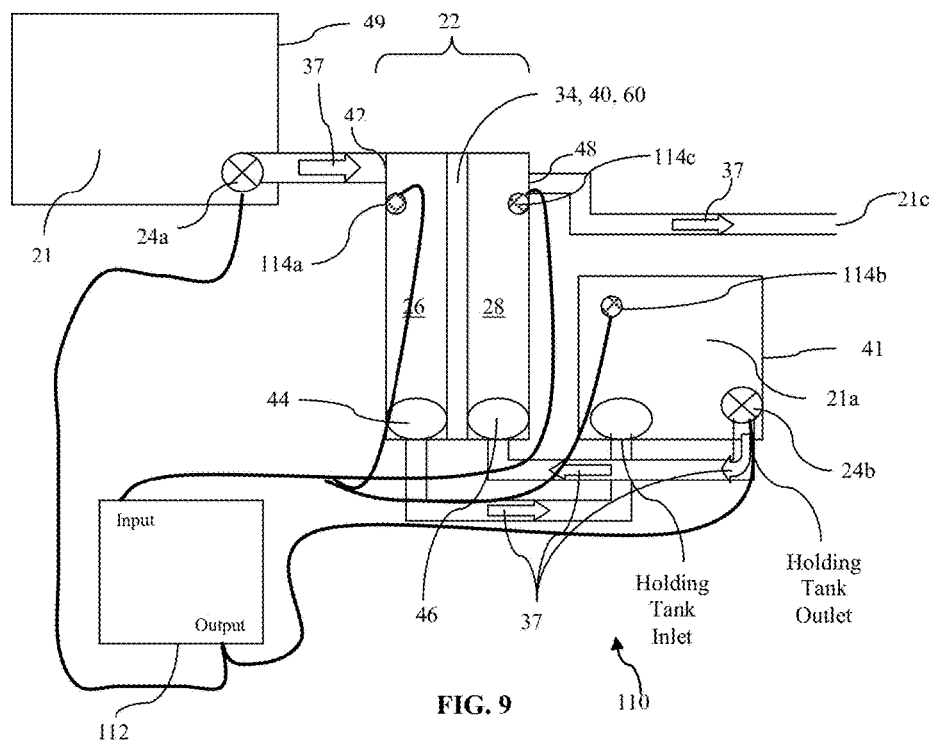
FIG. 9 is an end schematic view of the membrane pressure control system as shown in FIG. 8.

In one embodiment, the ability to maintain an equal pressure on either side of membrane 34 is provided with pressure control system 110, as shown in FIGS. 8-9. Pressure control system 110 may be used with single electrolytic cell 22 of FIGS. 1a, 8, multiple electrolytic cell 22' of FIG. 3, or some other variation of those electrolytic cells. Pressure control system 110 maintains equal pressure on both sides of membrane 34 so that a pressure difference does not drive contaminated water 21 across membrane 34. Membrane 34 maintains a substantial pH difference restricted only by electrically driven ionic transport that occurs across membrane 34. Membrane 34 provides that contaminated water 21 follows the path shown by flow direction arrows 37, maximizing the efficiency of electrolytic system 22. If significant pressure driven flow of water occurs across membrane 34, efficiency goes down as pH difference is reduced and reactions are slowed.

Figure 11B:
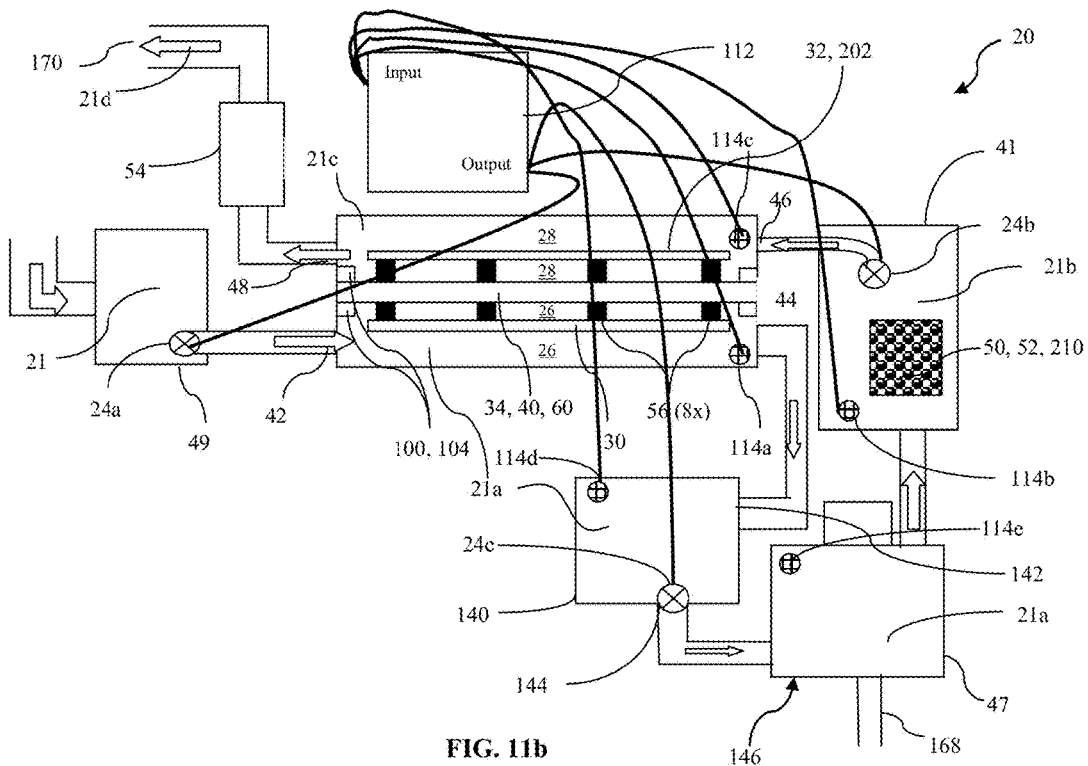
FIG. 11b is a top schematic view illustrating an embodiment similar to that of FIG. 11a with a surge tank and a filter included for capturing biological materials.

Pressure control system 110 includes pressure control unit 112 that receives input from water level sensors 114a, 114b, 114c and provides signals to control operation of flow directing devices 24a, 24b. Flow directing device 24a and 24b may each be a pump. Alternatively, flow directing device 24a could be a flow mechanism that works by gravity feed and includes flow restrictors. Water level sensor 114a monitors the level of contaminated water 21a in anode chamber 26, water level sensor 114b monitors the level of contaminated water 21b in holding tank 41, and water level sensor 114c monitors the level of contaminated water 21b in cathode chamber 28. Pressure control unit 112 monitors levels of contaminated water 21, 21a, 21b, within anode chamber 26 and cathode chamber 28, as well as holding tank 41, and determines where flow needs to occur to equalize level across membrane 34. If a difference in level is found pressure control unit 112 sends a signal to increase or decrease flow at flow directing device 24a, 24b. Equalizing level equalizes pressure across membrane 34. In embodiments that include filter 47 between anode chamber 26 and holding tank 41, such as shown in FIG. 11b, the operation of filter 47 and surge tank 140 are coordinated with the pressure control system 110 as further described herein below.

In one embodiment, flow directing devices 24a and 24b have the same volume pumping capacity and run at the same volume rate so levels in anode chamber 26 and cathode chamber 28 should remain approximately equal. In one embodiment, the contaminated water level difference tolerance on either side of membrane 34 is within ½". If the level measurement on one side of membrane 34 is found to be different from the level measurement on the other side by more than this tolerance, then control unit 112 sends a signal to adjust flow rate of either flow directing device 24a, 24b.

Applicants found that membrane 34 allowed maintenance of a pH difference of at least 6 pH units in the contaminated water between anode chamber 26 and cathode chamber 28 when a voltage sufficient to electrolyze water was applied between anode 30 and cathode 32 without flow from anode chamber to cathode chamber. Voltages in the range from 10 to 17 volts were used. The range from 12 to 15 volts was found to provide good results. The current was in the range from 10 to 20 amperes for electrodes having an area of 7 ft$^2$. The temperature was in the range from 10° C. to 25° C., varying with the season. Flow was in the range from 1 to 2 gallons per minute. The electrolytic cell used in the experiment had a volume of 62 gallons. The voltage used varied with the conductivity of the water. In one static experiment, without flow, pH was 2 in anode chamber 26 and 10 in cathode chamber 28, a difference of 8 pH units.

Figure 10:
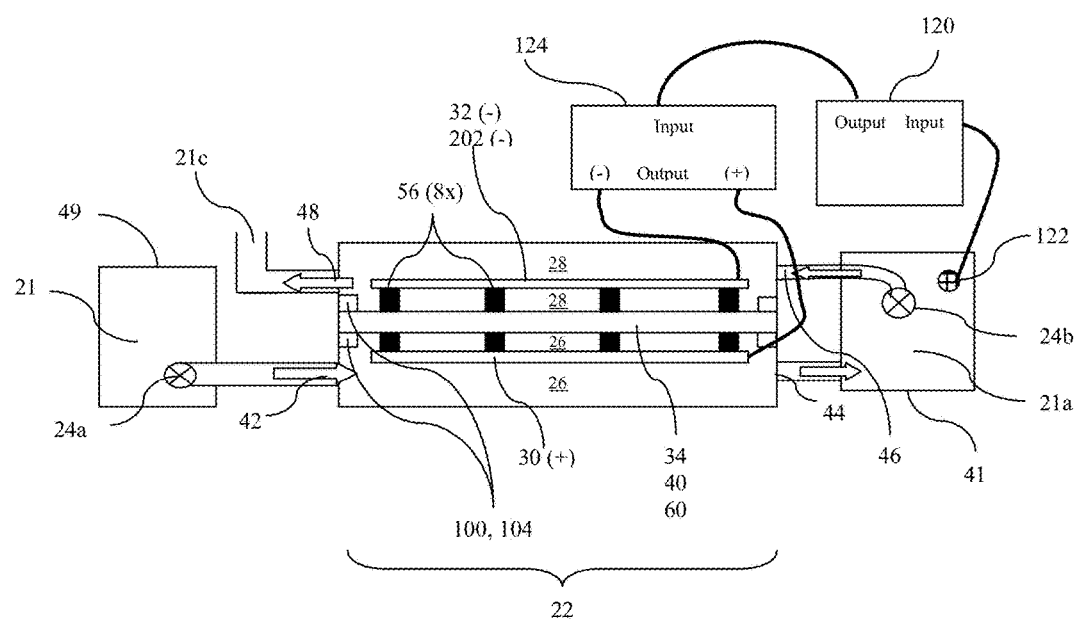
FIG. 10 is a top schematic view of the membrane pH control system used in conjunction with electrolytic cells of the present patent application.

Applicants found that they could measure pH in a single location to characterize functioning of the system. In one embodiment, pH control unit 120 is connected to receive data from pH sensor 122, as shown in FIG. 10. pH control unit 120 and pH sensor 122 can be included in the single cell embodiment of FIG. 1a or a multiple electrolytic cell embodiment, such as that of FIG. 3, or some other variation of those electrolytic cells. pH control unit 120 can have its own power supply or it can be connected to receive power from DC power control unit 124. pH sensor 122 may be a commercial pH sensor such as sensor made by Sensorex, Garden Grove, Calif., part number S650CD.

In one embodiment, pH sensor 122 is located within holding tank 41 and measures pH of aluminum- or iron-containing contaminated water 21b in holding tank 41. pH sensor 122 is located outside of electrolytic cell 22 so that the electric field generated within the electrolytic cell does not interfere with functioning of pH sensor 122. The output signal of pH sensor 122 is typically in the range of 4 mA to 20 mA and is in direct proportion to pH readings, with higher current correlating to higher pH.

DC power control unit 124 is electrically connected to anode 30 and cathode 32 to provide a voltage there-between sufficient to electrolyze water, generating oxygen and hydrogen ions at the anode and generating hydroxyl ions at the cathode. pH control unit 120 translates the pH reading from pH sensor 122 to a signal to step-up or step-down voltage applied by DC power control unit 124 across anode and cathode. By restricting flow of hydrogen and hydroxyl ions between anode chamber 26 and cathode chamber 28 membrane 34 produces the substantial pH difference between anode chamber 26 and cathode chamber 28 and provides highly acidic contaminated water 21a exiting anode chamber 26 that can dissolve sufficient solid aluminum 50 or iron 52 to support agglomeration of high molecular weight molecules. Other contaminants that may have been in entering contaminated water 21 also agglomerate on the aluminum hydroxide or iron hydrous oxide, including nitrates, phosphates, arsenates and other negative ion species. As described herein above, membrane 34 has a pore size sufficiently large to allow restricted electrically driven ion transfer to occur, but sufficiently small to limit mass transfer of contaminated water 21 and maintain a significant pH difference. In operation, applicants found that the applied voltage of 10 to 15 volts provided a pH of less than or equal to 4-pH units in anode chamber 26 and greater than or equal to 10-pH units at cathode 32 before flow initiation, or a pH difference of 6 pH units. Membrane 34 can support a pH difference of approximately 9 pH units when a higher voltage is applied by DC power supply 124 to produce a pH of less than or equal to 2-pH units at anode 30 and greater than or equal to 11-pH units at cathode 32 in a static experiment.

Figure 13A:
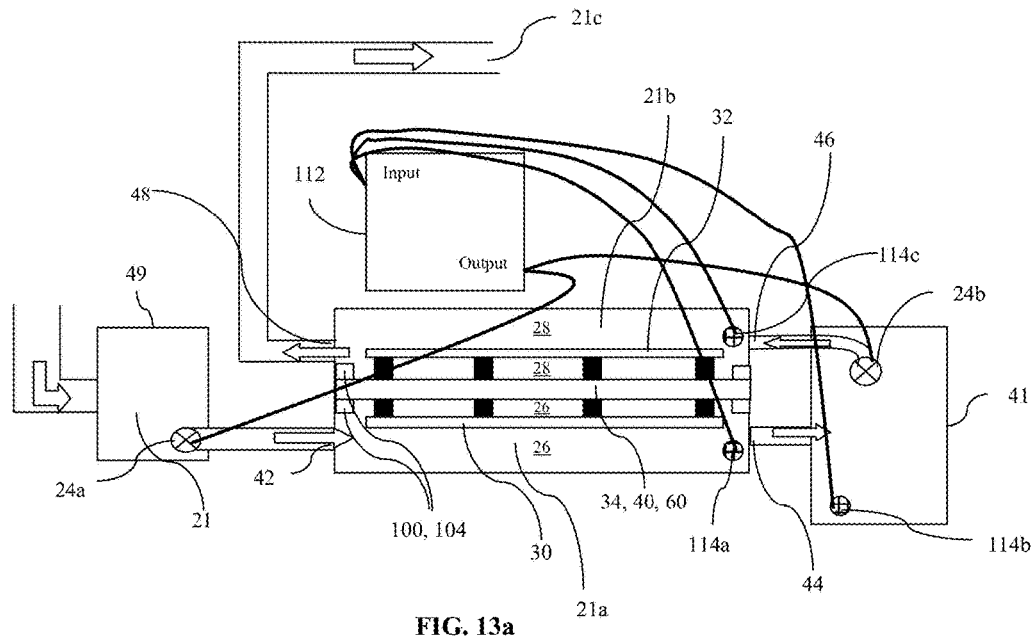
FIG. 13a is a top schematic view of a system incorporating the electrolytic cells of either FIG. 1a or 3 and for removing negative ions, such as nitrates, from contaminated water.

In one embodiment, electrolytic cell 22, 22' of FIG. 1a, FIG. 3 and FIG. 13a can be used to reduce nitrate to nitrogen gas. Catalyzed by the valve metal surface of cathode 32, nitrates in contaminated water 21, 21a undergo a series of reactions in contaminated water 21a, 21b and with electrons provided at cathode 32 according to equation 1 to generate nitrogen gas, as shown in box 138 of FIG. 14b.

$$2NO_3^- + 12H^+ + 10e^- = N_{2(g)} + 6H_2O \qquad \text{at cathode (1)}$$

Nitrogen gas escapes into the air while water generated in this reaction merges with contaminated water with nitrates removed 21c. Contaminated water 21c with nitrates removed is then directed out of cathode chamber 28 via cathode chamber outlet 48.

Figure 13B:
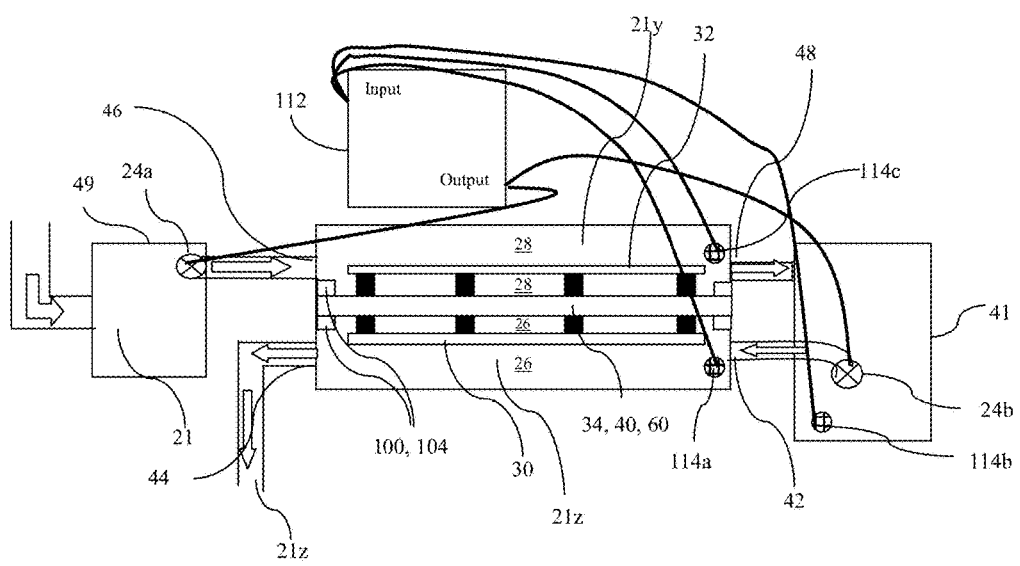
FIG. 13b is a top schematic view illustrating an embodiment similar to that of FIG. 13a with reverse flow.

In a variation on this embodiment, the flow of water in electrolytic cell 22, 22' is reversed to achieve the same effect of reducing the nitrate to nitrogen gas, as depicted in FIG. 13b. Nitrate-contaminated water 21 is directed by flow directing device 24a to cathode chamber 28 through cathode chamber inlet 46. Nitrate-contaminated water 21 reacts at cathode 32, elevating the pH of nitrate-contaminated water 21 to a level in the range from 11 to 12. A highly complex series of transitory reactions occurs in the high pH water, resulting in the nitrate being reduced to nitrogen gas which is vented to the atmosphere.

While the sequence and nature of the reactions involved have not been fully characterized, the effectiveness of an electrochemical process to reduce nitrate to nitrite, nitrogen gas, and ammonia, has been described in a paper by Dash and Chaudhari, "Electrochemical denitrification of simulated ground water," Centre for Environmental Science and Engineering, Indian Institute of Technology Bombay, Powai, Mumbai, India, July 2005, incorporated herein by reference.

Highly alkaline water with nitrate removed 21y exits cathode chamber 28 through cathode chamber outlet 48 and into holding tank 41 where it is directed by flow directing device 24b to anode chamber inlet 42. In anode chamber 26, the pH of highly alkaline nitrate-free water 21y is lowered and nitrate-free water 21z with substantially the same pH as the contaminated water entering cathode chamber 28, which is approximately neutral pH, flows out of anode chamber 26 through the anode chamber outlet 44, where it is discharged as nitrate-free water 21z. While nitrates have been removed, other contaminants that were in entering nitrate-contaminated water 21 may remain in discharged nitrate-free water 21z.

Because calcium ions in highly alkaline contaminated water 21y would coat the catalytic surface of cathode 32, interfering with the reaction to remove nitrate, removing calcium ions before using electrolytic cell 22, 22' is desirable. Calcium ions may be removed using complexation, chemical precipitation, or ion exchange. For applications, such as removing nitrate from calcium-free water used for washing semiconductor wafers after a nitric acid treatment, electrolytic cell 22, 22' can be used directly.

In one embodiment, an electrolytic cell is used for removing molecules of high molecular weight, as described herein below, followed by a second electrolytic cell, as shown in FIGS. 13a-13b, which can be used for removing nitrates by gasification. In one embodiment, the first electrolytic cell for removing the molecules of high molecular weight has contaminated water first entering its anode chamber while the second electrolytic cell for removing nitrates has the contaminated water first entering its cathode chamber.

With metallic aluminum 50 or iron 52 provided in holding tank 41, electrolytic system 20 of FIG. 1*a*, FIG. 3 and FIG. 11*a* can be used to remove molecules of high molecular weight from contaminated water 21. Molecules of high molecular weight are defined as molecules having a molecular weight of 200 or higher. Aluminum ions generated from dissolution of metallic aluminum 50 in acidic contaminated water 21*b* from anode chamber 26 react at cathode 32 to produce aluminum hydroxide that agglomerates high molecular weight molecules in contaminated water 21*c*. Iron ions generated from dissolution of metallic iron 52 in acidic contaminated water 21*b* from anode chamber 26 react at cathode 32 to produce ferric hydrous oxide that agglomerates high molecular weight molecules in contaminated water 21*c*. Other materials, such as phosphates, chlorides, and other negative ion species will also agglomerate onto the aluminum hydroxide and/or the ferric hydrous oxide. Filter 54 in the discharge line filters out the aluminum hydroxide and/or the ferric hydrous oxide with its agglomerated materials from contaminated water 21*c*, leaving clean water 21*d* flowing out of filter 54.

Typical molecules of high molecular weight include organics, pharmaceuticals, detergents, disinfectants, protein fragments and human and animal waste byproducts.

Figure 14A:
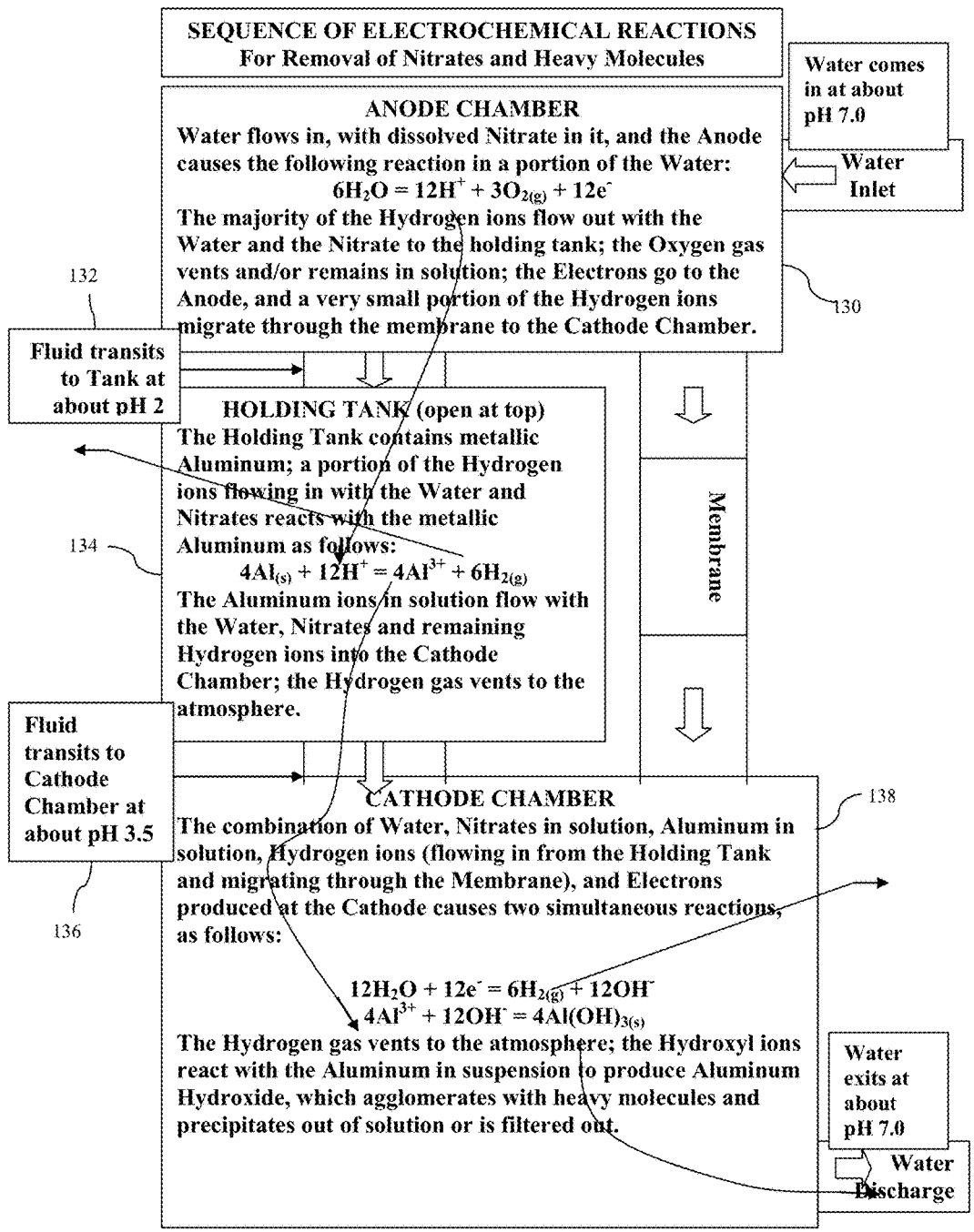
FIG. 14a is a flow chart illustrating an embodiment of a process for removing nitrates and for removing molecules of high molecular weight and other negative ions, such as phosphates and chlorides, from contaminated water.
Figure 14B:
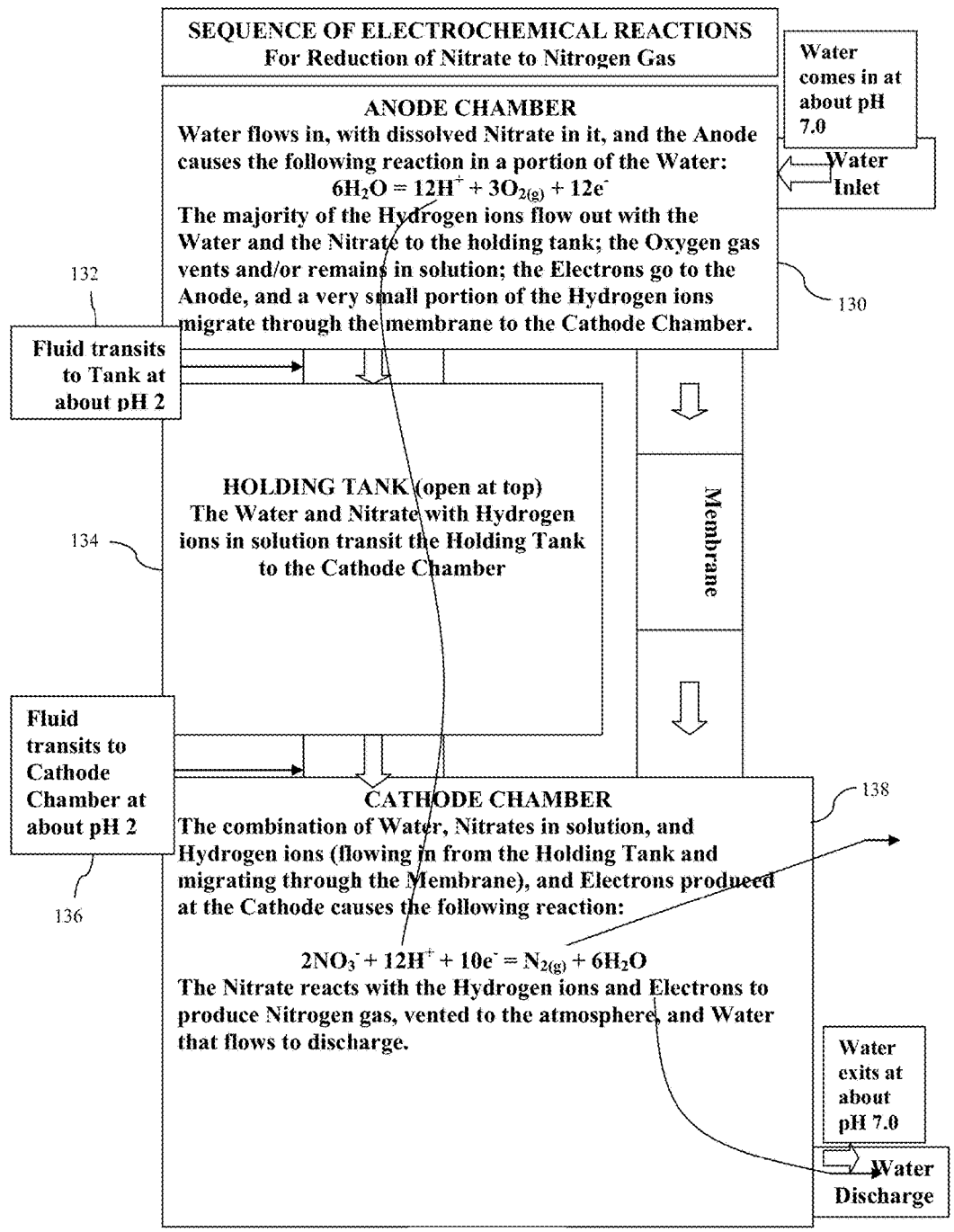
FIG. 14b is a flow chart illustrating an embodiment of a process for removing nitrates, from contaminated water.

In anode chamber 26 some of contaminated water 21 reacts at anode 30 to generate oxygen gas that escapes, hydrogen ions in the water, and electrons that flow in the anode to DC power supply 124 according to equation 2 and as shown in box 130 in the flow chart in FIG. 14*a*.

$$6H_2O = 12H^+ + 3O_{2(g)} + 12e^- \quad \text{at anode (2)}$$

Fluid containing the hydrogen ions transits out of anode chamber 26 to holding tank 41, as shown in box 132, where it encounters solid aluminum 50. Metallic aluminum 50 may be any aluminum material that has a high surface area. Some of the hydrogen ions react with metallic aluminum 50 to generate aluminum ions and hydrogen gas according to equation 3 and as shown in box 134 in FIG. 14*a*.

$$4Al_{(s)} + 12H^+ = 4Al^{3+} + 6H_{2(g)} \quad \text{in holding tank (3)}$$

Metallic aluminum 50 can be provided in holding tank 41 or it can be provided elsewhere in the system between anode 30 and cathode 32, as long as metallic aluminum 50 is immersed in acidic contaminated water 21*a* for a sufficient time to react with the hydrogen ions to produce aluminum ions. As acidic water from anode chamber 26 has a longer residence time in holding tank 41, locating metallic aluminum 50 there is likely to produce sufficient aluminum ions in contaminated water 21*b*.

From holding tank 41 aluminum ion containing contaminated water 21*b* flows into cathode chamber 28, as shown in box 136.

Meanwhile, in cathode chamber 28 some of contaminated water 21*b* reacts, taking electrons supplied by cathode 32 from DC power supply 124 to generate hydrogen gas, that escapes, and providing hydroxyl ions in contaminated water 21*c* according to equation 4, and as shown in box 138. Alternatively the hydrogen gas may be collected and otherwise used later as a fuel.

$$12H_2O + 12e^- = 6H_{2(g)} + 12OH^- \quad \text{at cathode (4)}$$

In addition, aluminum ions in contaminated water 21*b*, generated in holding tank 41 according to equation 3, react at cathode 32 with hydroxyl ions to form aluminum hydroxide according to equation 5.

$$4Al^{3+} + 12OH^- = 4Al(OH)_{3(s)} \quad \text{in cathode chamber (5)}$$

Th aluminum hydroxide acts as an agglomerating material for high molecular weight molecules in solution in contaminated water 21*b*. High molecular weight molecules adsorb onto the aluminum hydroxide which then precipitate as agglomerated particles.

Contaminated water 21*c* with agglomerated high molecular weight material is then directed out of cathode chamber 28 via cathode chamber outlet 48. The agglomerated particles have sufficient size to be removed from the contaminated water by filter 54, leaving water clean of high molecular weight material 21*d*. In one embodiment, applicants used a commercial bag filter, Rosedale model 8, from Rosedale Products, Inc., Ann Arbor, Mich., to remove the agglomerated particles.

As contaminated water 21*b* transits the cathode chamber 28, the flow of hydrogen ions and aluminum ions with contaminated water 21*b* plus the flow of electrons through membrane 34 serves to neutralize the pH of the contaminated water 21*c* in cathode chamber 28, so the pH of the contaminated water 21*c* at cathode chamber outlet 48 and the pH of clean water leaving filter 54 is the same as the pH of entering contaminated water 21, which is approximately 7.0 pH units.

Figure 15:
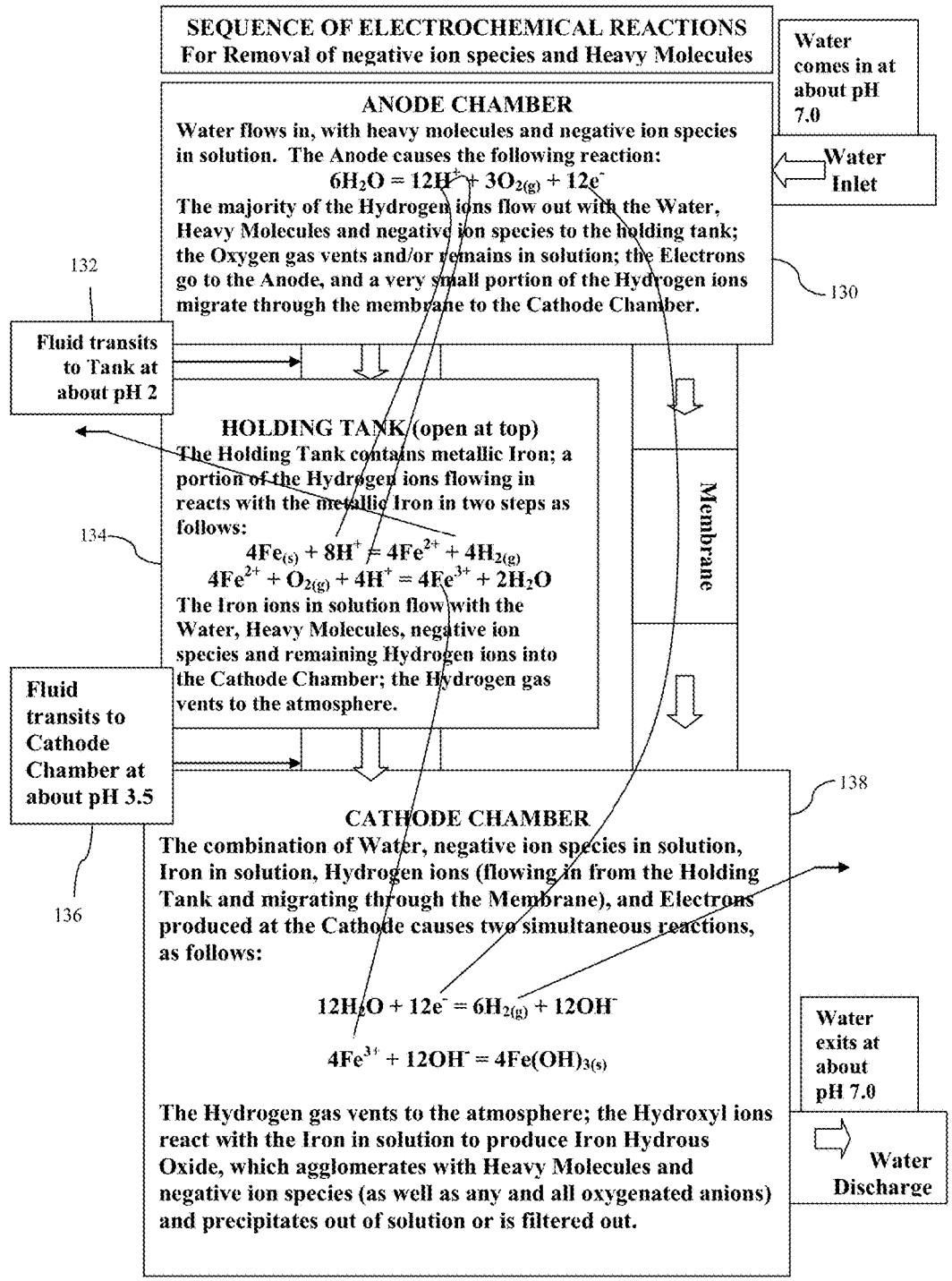
FIG. 15 is a flow chart illustrating an embodiment of a process for removing molecules of high molecular weight and for removing other negative ions, such as phosphates and chlorides, from contaminated water.

In another embodiment, metallic iron 52 is provided in holding tank 41, and acidified contaminated water 21*a* from anode chamber 26, according to equation 6, dissolves some of metallic iron 52, providing iron ions in contaminated water 21*b*, according to equations 7 and 8 and as shown in FIG. 11*a* and the flow chart in FIG. 15.

$$6H_2O = 12H^+ + 3O_{2(g)} + 12e^- \quad \text{at anode (6)}$$

The electrons go to the anode providing electric current in the circuit. The $O_{2(g)}$ vents to the atmosphere or remains in solution. Most hydrogen ions flow out of anode chamber 26 along with the water contaminated with heavy molecules and negative ion species, typically at approximately pH 2, to holding tank 41, while a few of the hydrogen ions migrate through the membrane and enter cathode chamber 28.

$$4Fe_{(s)} + 8H^+ = 4Fe^{2+} + 4H_{2(g)} \quad \text{in holding tank (7)}$$

$$4Fe^{2+} + O_{2(g)} + 4H^+ = 4Fe^{3+} + 2H_2O \quad \text{in holding tank (8)}$$

In holding tank 41 metallic iron 52 reacts with hydrogen ions entering from anode chamber 26, as shown in equations 7 and 8. The iron ions in solution flow with the water contaminated with heavy molecules and negative ion species and remaining hydrogen ions to cathode chamber 28 while the $H_{2(g)}$ either vents to the atmosphere or combines with oxygen gas to form water.

Iron is not sufficiently active a metal to consume all the hydrogen ions; thus, the solution remains acidic, typically at approximately pH 3.5, facilitating keeping $Fe^{3+}$ ions in solution for further reaction with hydroxyl ions formed at cathode 32. Contaminated water 21*b* containing these $Fe^{3+}$ ions is treated in cathode chamber 28 to remove negative ion species, such as nitrates, phosphates, and arsenate and to agglomerate molecules of high molecular weight and other negative ion species, such as chlorides, that may have been present in entering contaminated water 21. The high molecular weight material, nitrates, phosphates, arsenate, chlorides, and other unwanted species agglomerate onto iron hydrous oxide particles that form in cathode chamber 28 from the dissolved iron ions reacting with hydroxyl ions formed at cathode 32. Two reactions occur in cathode chamber 28.

First, the dissociation of water with electrons produced at cathode 32 forms hydroxyl ions and hydrogen gas according to equation 9, as shown in FIG. 11*a* and in the flow chart in FIG. 15:

$$12H_2O + 12e^- = 6H_{2(g)} + 12OH^- \quad \text{at cathode (9)}$$

The $H_{2(g)}$ vents to the atmosphere while $Fe^{3+}$ ions in contaminated water 21b combine in the second reaction at cathode 32 with hydroxyl ions formed there according to equation 9 to form iron hydrous oxide according to equation 10:

$$4Fe^{3+}+12OH^-=4Fe(OH)_{3(s)} \quad \text{in cathode chamber} \quad (10)$$

The nitrates, phosphates, arsenate, chlorides, and high molecular weight molecules agglomerate on the iron hydrous oxide $Fe(OH)_{3(s)}$ particles. The agglomerated particles precipitate out of water 21c. Water 21c with agglomerated particles exits cathode chamber 28 through cathode chamber outlet 48. The nitrates, phosphates, arsenate, chlorides, and high molecular weight molecules agglomerated on iron hydrous oxide particles are then filtered out of the aqueous stream using filter 54, as shown in FIG. 11a to provide a discharge of cleaned water 21d that is back to substantially the same pH as the contaminated water entering anode chamber 26, which is approximately neutral pH.

Applicants found that the in situ generation of iron hydrous oxide by dissolution of iron in acidified contaminated water 21a from anode chamber 26 followed by reaction of the iron ions so formed with hydroxyl ions at cathode 32 produced a finely divided entity that was particularly effective at removing the above listed unwanted contaminants from the water. Applicant filtered the effluent with filter paper and visually observed the fine iron hydrous oxide particle size. The interaction between oxy-anions and iron hydrous oxide has been described in the book, "Anion Interactions with Freshly Prepared Hydrous Iron Oxides," by J. B Harrison and V. E Berkheiser, Clays and Clay Minerals, Vol. 30, No. 2, pages 97-102, 1982), incorporated herein by reference.

In this embodiment, because nitrates are removed by surface chemical reaction and adsorption, rather than reduction at the cathode, a valve metal is not needed in the cathode as a catalyst. The expense of a valve metal surface for the cathode is thus avoided in this embodiment. Cathode 202 is fabricated of a metal, such as stainless steel. Nickel, copper, silver or other conductive metals can be used for cathode 202.

In addition, since reaction of nitrates at the cathode is avoided, techniques to enhance that reaction, such as cathode tilting, are avoided, freeing space for more electrodes per tank.

Also, in this embodiment, because nitrates are removed by surface chemical reaction and adsorption on the iron hydrous oxide particles, rather than being reduced at the cathode, less electric current need be provided. Five electrons to reduce each nitrate ion to nitrogen gas are avoided in this process while 3 electrons are used to form each iron hydrous oxide.

The current apparatus and method of removing nitrates and molecules of high molecular weight offer several advantages over bio-oxidative, chemical and past electrolytic treatments of water. The apparatus of the current patent application uses a much smaller footprint that reduces the physical size and cost of the treatment plant by a factor of between 5 and 10. In several embodiments, the process effectively eliminates sludge byproduct and unpleasant odors generated by the bio-oxidative process. In several embodiments, no chemicals are applied and byproducts are mainly nitrogen, oxygen and hydrogen gases that may be freely released to the atmosphere or may be collected. The present patent application describes a process that uses less electricity than that described in the '873 patent. In use the process is expected to use 1.1 kilowatt hours of electricity per 1000 gallons of water treated. At a cost of 10-cents per kilowatt hour, the cost for electricity to treat 1000 gallons of water is therefore about 11 cents. Cost for facilities and labor should add a few more cents per 1000 gallons making the total cost less than half that of conventional techniques that are presently about 35-cents per 1000 gallons.

Applicant also found that the localized highly acidic condition at the anode caused two effects on biological materials, such as bacterial cells, that are in the contaminated water: one is protonation of proteins and protein fragments that may be present in contaminated water; and the other is hydrolysis of elements of the DNA of residual bacterial cells in contaminated water, breaking up the helical ribbons of their DNA, as shown in FIG. 16 and FIG. 17 respectively.

As described herein above, in the reaction at anode 30, entering water 21, contaminated with organic material, including proteins and protein fragments, becomes highly acidic, with a pH of approximately 2, by the hydrolysis of water releasing hydrogen ions, as shown in equation 11.

$$2H_2O=4H^++O_{2(g)}+4e^- \quad \text{at anode} \quad (11)$$

The hydrogen ions serve as a catalyst to protonate proteins of organic materials in two simultaneous ways: cleaving peptide bonds that hold the chain of amino acid residues together in the primary structure that forms proteins, reducing the proteins to smaller fragments or individual amino acids as shown for the cleaving of a two-amino-acid peptide in FIG. 16; and breaking the hydrogen bonds in the secondary structure that gives proteins their configuration or shape.

The peptides present at the start of the treatment are not truly dissolved species. They are hydrated structures that are suspended in the aqueous medium by virtue of their conformation. Disrupting this conformational balance by acid catalyzed hydrolysis produces coagulation. When exposed to substantially lowered pH, as in anode chamber 26, the protein turns highly positive, leading to intramolecular repulsion great enough to break weak hydrogen bonds in the protein's secondary structure and cause unfolding of the protein. The unfolding exposes hydrophobic groups.

These alterations irreversibly disrupt the protein structure, inactivating both biological and mechanical properties. The resultant material forms insoluble coagulates that are lighter than water. Thus, the aggregated material rises to the surface of the water where it can be skimmed. The rising to the surface may be assisted by the oxygen bubbles formed by the dissociation of water of equation 11.

Further, in a separate reaction, hydrogen ions ($H^+$) formed in equation 11 also attack the negative sites ($O^-$) in the sugar-phosphate helical ribbons of DNA or RNA of organisms, such as bacteria, cleaving the bonds between the phosphate esters and the sugars, fragmenting the backbone of the DNA ribbons and releasing sugars and phosphates into the water, as shown in FIG. 17. Once released into the water, the phosphates and sugars are carried on into holding tank 41 and from there to cathode chamber 28. In this hydrolysis reaction, the hydrogen ions catalyze the bond breaking and are not consumed. The fragmenting of the DNA backbone merely involves hydrolysis, or addition of a water molecule across the chemical bond. Water is the only consumable.

Applicant found that, when the supply of contaminated water 21 contained sufficiently high levels of biologic or organic material, the volume of residual aggregated materials, protein fragments and other organic waste flowing out of the anode chamber 26 would gradually coat a variety of surfaces downstream from the anode chamber, in particular the aluminum 50 and/or iron 52 in the holding tank 41. Such coating would cause an occlusion of reactions described herein. In order to prevent such occlusion, applicant determined that skimming and/or filtration would remove such aggregated materials, protein fragments and other organic waste to a degree sufficient to prevent coating of downstream surfaces.

Applicant found that providing filter 47 positioned in line between anode chamber outlet 44 and holding tank 41 removed the aggregated materials, protein fragments and other organic waste. As depicted in FIG. 11b, contaminated water 21a, laden with biological waste, enters surge tank 140 through surge tank inlet 142. Here contaminated water 21a is maintained at water level 143a while it is pumped out through surge tank outlet 144 by pump 24c to filter 47. In filter 47 the acid-aggregated materials, including protein fragments and other organic waste, are removed. The storage in surge tank 140 permits an interrupted flow of entering contaminated water 21 while allowing function of a back pulse feature. While pump 24c is off and clean water is back pulse provided to filter 47 to clean off debris collected on filter 47, water accumulates in surge tank 140 to water level 143b. Then, when back pulsing is finished, pump 24c turns on and the water in surge tank 140 returns to water level 143a.

Figure 12A:
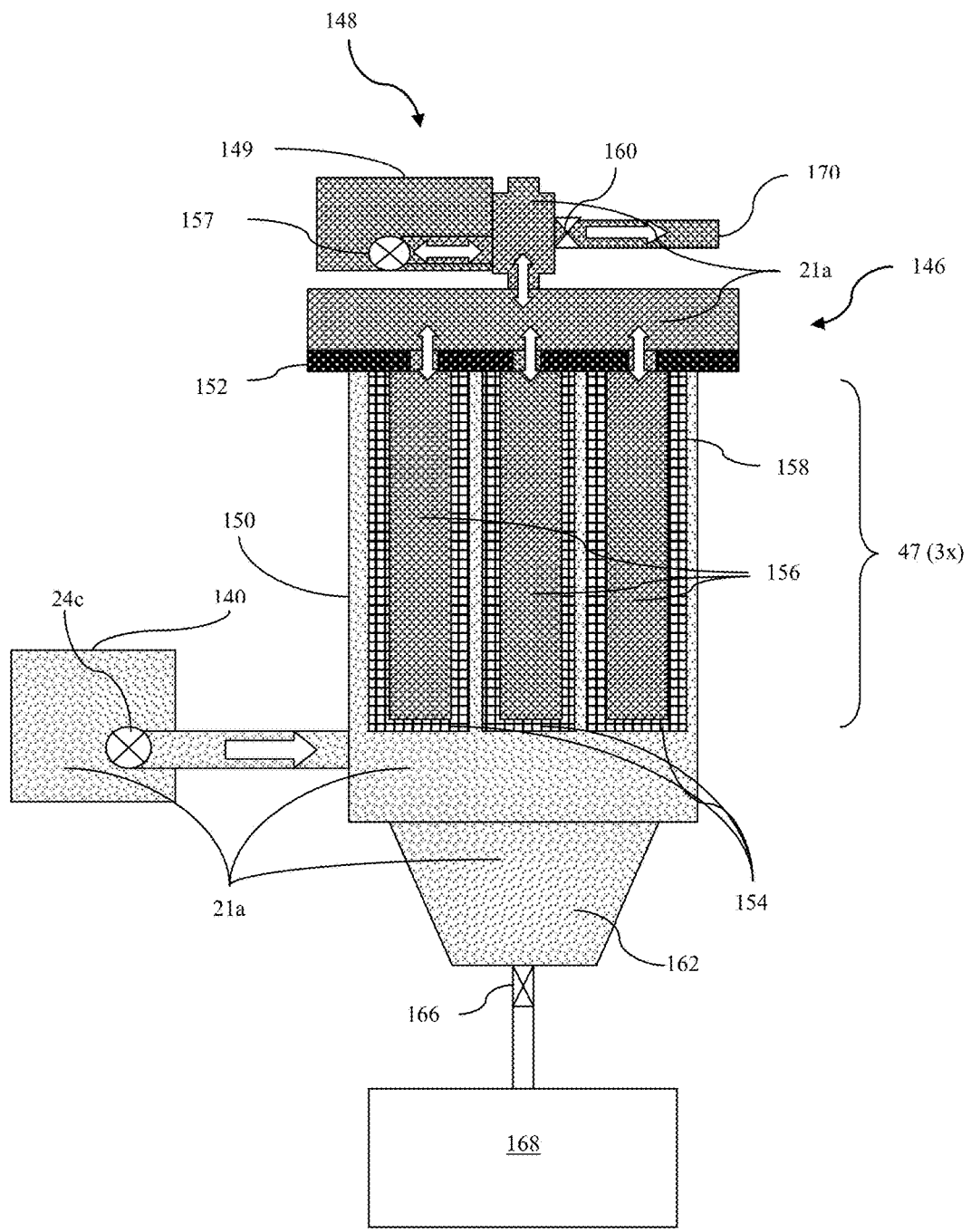
FIG. 12a is a side sectional schematic view of a filter assembly with a back pulse pump used in removing solid particles and biological materials from the water in FIG. 11b and for removing these solid particles and biological materials from the filter.
Figure 12B:
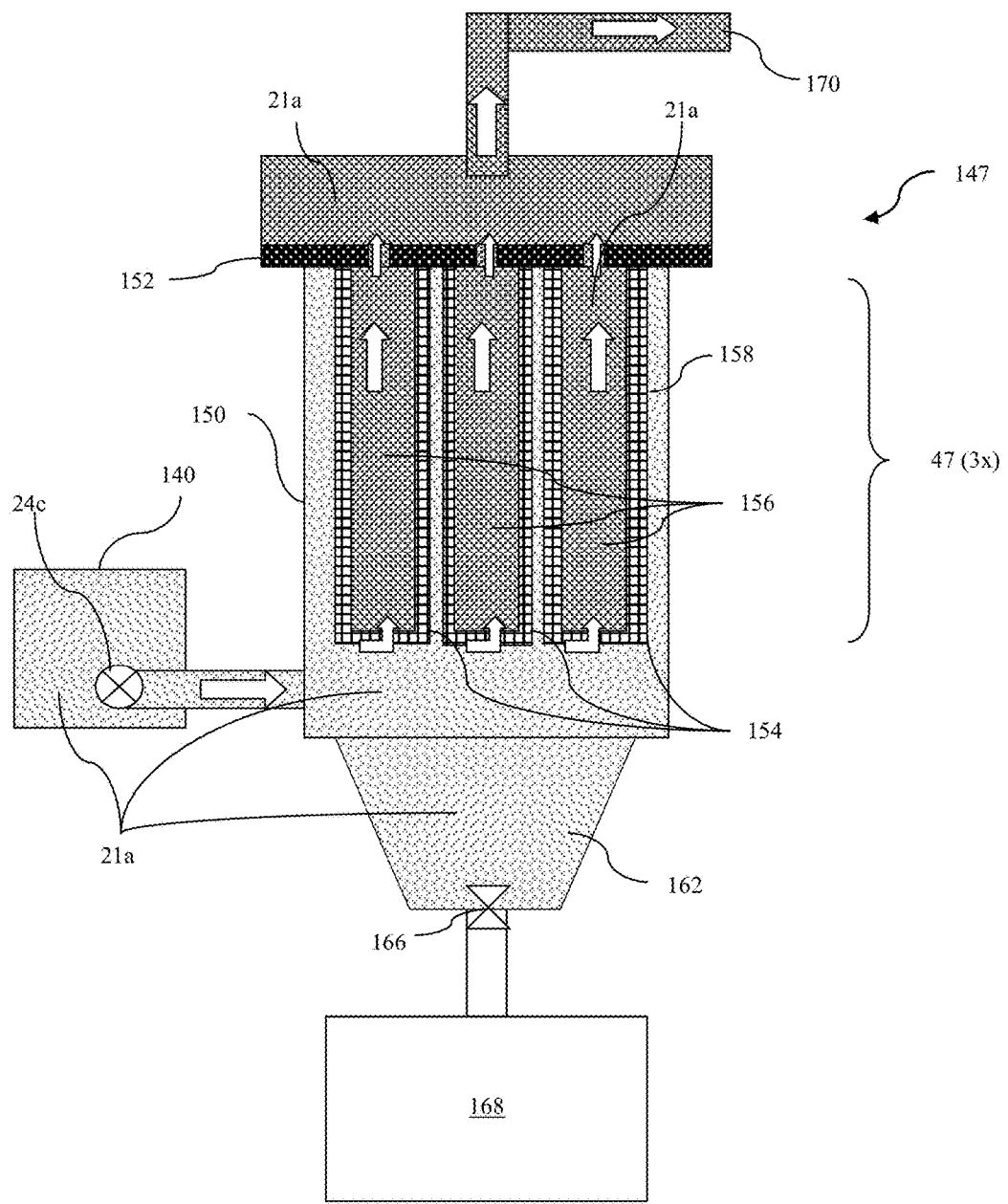
FIG. 12b-12c are side sectional schematic views of a filter assembly with a gravity feed back pulse embodiment used in removing solid particles and biological materials from the water in FIG. 11b and also used in removing solid particles and biological materials from the filter.
Figure 12C:
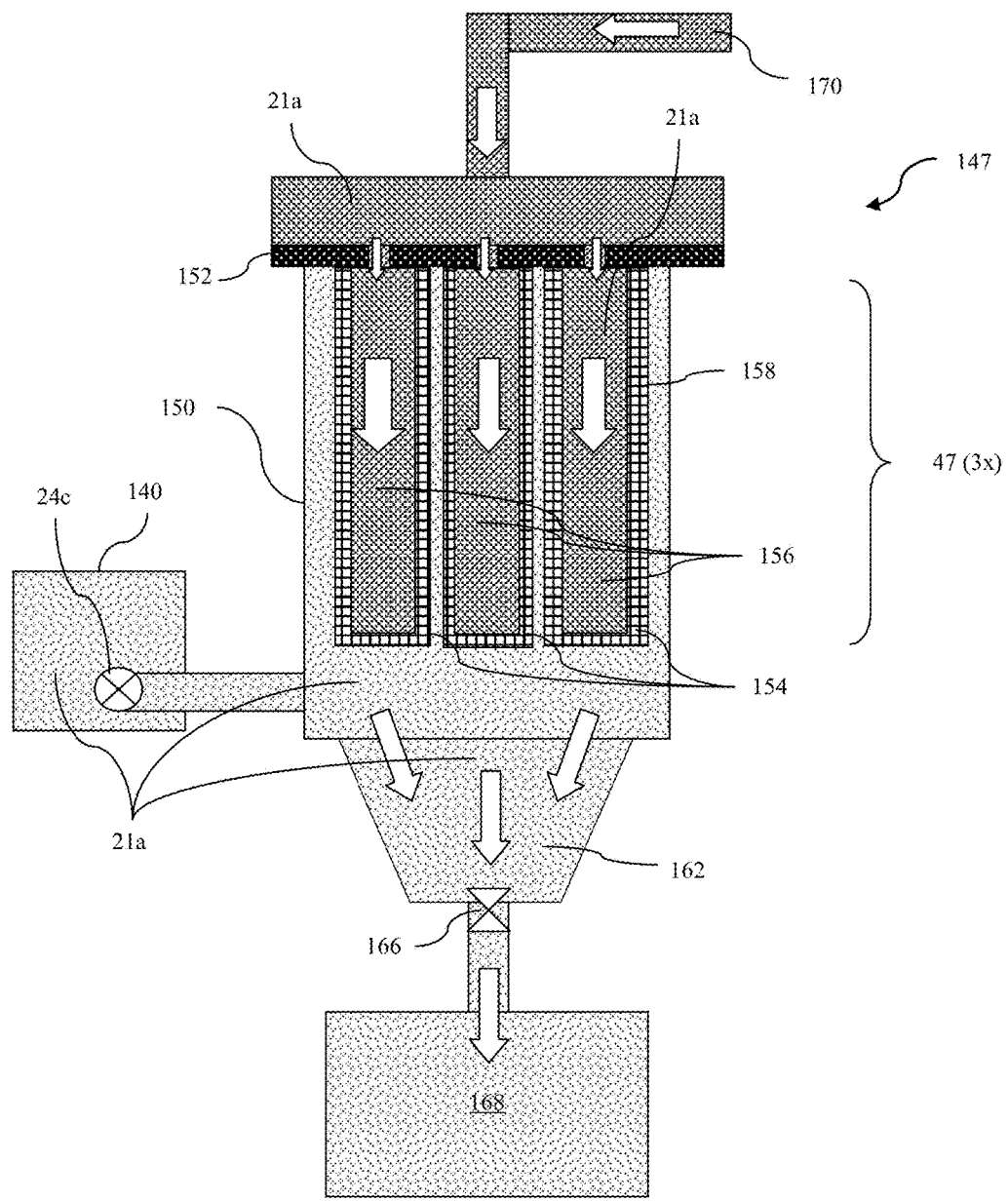

In one embodiment, filter 47 is part of back-pulse filtration unit 146, 147 as shown in FIGS. 12a-12c. In this embodiment, contaminated water 21a with aggregated materials, protein fragments and other organic waste enters filter chamber 150 while pump 24c is operating. Contaminated water 21a is cyclically pushed by pump 24c into filter 47 mounted on filter mounting plate 152. In one embodiment, filter 47 uses sleeves of membrane material 154 around perforated pipe 156. Any other suitable means of structurally preventing sleeves of membrane material 154 from collapsing can be used. Filter 47 is sized to remove aggregated materials, protein fragments and other organic waste. In one embodiment, membrane material 154 is PTFE and has a pore size of 0.5 micrometers.

Back-pulse filtration unit 146 uses back pulse pump unit 148, as shown in FIG. 12a, while back-pulse filtration unit 147 uses gravity, as shown in FIGS. 12b, 12c, for back pressure. Aggregated materials, protein fragments and other organic waste collect on outer surface 158 of membrane material 154 as the contaminated water 21a is pushed through filter 47 by pump 24c. At intervals of time, such as every 10 or 20 minutes, pump 24c is turned off and either back pulse pump 157 or reverse gravity feed system 147 is activated to provide a back pulse of filtered water 21a in reverse direction through filter 47. This back pulse of water 21a causes the aggregated materials, protein fragments and other organic waste to release from surface 158 of membrane material 154 and fall into base 162 of filter chamber 150. Waste valve 166 opens for approximately 100 milliseconds during the period when pump 24c is off and reverse water flow is being applied. This allows aggregated materials, protein fragments and other organic waste to be discharged into waste collection system 168.

Back pulse pump unit 146 also includes back pulse pump 157, effluent shut-off valve 160, and tank 149, all controlled and coordinated by control unit 112. Pump 24c and back pulse pump unit 148, or gravity feed system 147, coordinated by control unit 112, regulate water flow direction during the filtration and filter cleaning processes. Filtered water 21a exits at water discharge 170. For practical purposes, it is desirable for filter 47 to be self-cleaning to prevent accumulation of aggregated materials, protein fragments and other organic waste and its potential to clog filter media and mitigate or prevent flow of contaminated water 21a. Alternatively, filter 47 could be any other kind of filter that is capable of removing unwanted material with a particle size of 1 micrometer or larger.

Nitrates and ammonia are not generally found together in contaminated water. If both were present first the nitrates would be removed with iron, as described herein above, then in a separate reaction the ammonia would be removed with magnesium hydroxide, as described herein below.

Applicant found that ammonia contamination could be removed from the water with the provision of magnesium hydroxide 210 in holding tank 41, instead of iron or aluminum, and reaction with phosphate that may already be in the water either from acid reaction with bacterial DNA, as described herein above, or from other sources. As ammonia is a breakdown product of biological materials it is often found together with biologically derived phosphates. The reaction takes advantage of the presence of the phosphates and removes them too.

Figure 18:
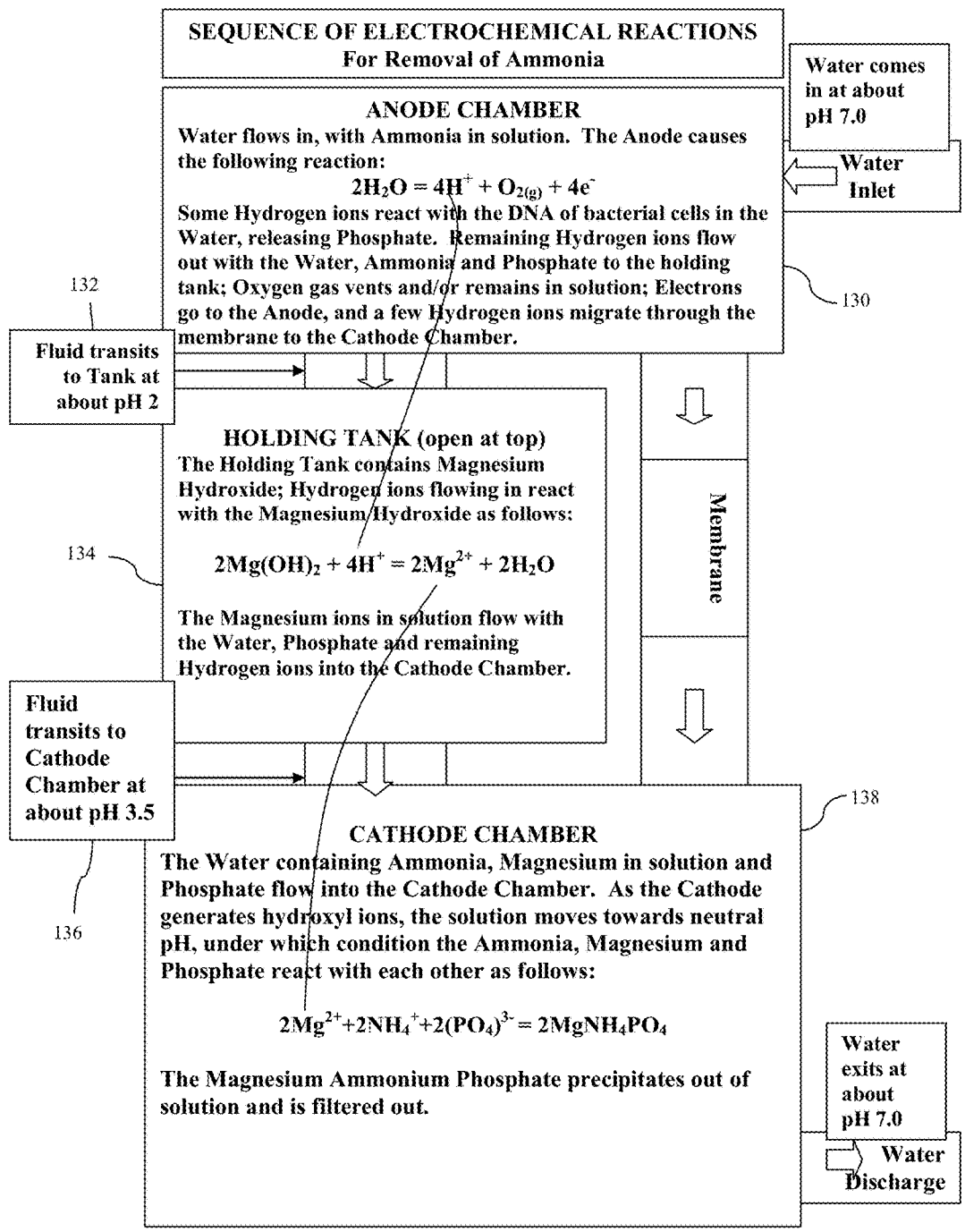
FIG. 18 is a flow chart illustrating an embodiment of a process for removing ammonia through electrically induced formation of magnesium ammonium phosphate.

The acidic water 21a flowing out of anode chamber 26, as shown in FIG. 1a, FIG. 11a and FIG. 18, reacts in holding tank 41 with magnesium hydroxide 210 to produce magnesium ions $Mg^{2+}$, as shown in equation 12.

$$2Mg(OH)_2 + 4H^+ = 2Mg^{2+} + 2H_2O \qquad \text{at anode (12)}$$

The $Mg^{2+}$ ions in solution then flow with water 21b containing phosphate and any remaining hydrogen ions, into cathode chamber 28, as also shown in FIG. 18. Hydroxyl ions produced at cathode 202 react with remaining hydrogen ions to produce water with a neutral pH, and the ammonia reacts with magnesium and phosphate in this neutral water in the cathode chamber to form magnesium ammonium phosphate, as shown in equation 13, $$2Mg^{2+} + 2NH_4^+ + 2(PO_4)^{3-} = 2MgNH_4PO_4 \qquad \text{at cathode (13)}$$

The magnesium ammonium phosphate precipitates out of solution and is filtered out.

While the disclosed methods and systems have been shown and described in connection with illustrated embodiments, various changes may be made therein without departing from the spirit and scope of the invention as defined in the appended claims.

What is claimed is:

1. An apparatus for treating contaminated water, comprising:
    an electrolytic cell, wherein said electrolytic cell includes an anode chamber, a cathode chamber, an anode, a cathode, and a membrane, wherein said anode chamber includes an anode, an anode chamber inlet and an anode chamber outlet, wherein said cathode chamber includes a cathode, a cathode chamber inlet and a cathode chamber outlet, wherein said anode chamber inlet is configured for receiving the contaminated water, wherein said membrane is configured and positioned in said electrolytic cell to maintain a pH difference between said anode chamber and said cathode chamber when a voltage is applied between said anode and said cathode, wherein when the voltage is applied between said cathode and said anode, hydrogen ions are generated in the contaminated water at said anode and hydroxyl ions are generated in the contaminated water at said cathode;
    a flow director, wherein said flow director is connected to direct the contaminated water containing said hydrogen ions from said anode chamber outlet to said cathode chamber inlet; and a holding tank and a metal, wherein said metal is located in said holding tank, wherein said holding tank is located inline between said anode chamber outlet and said cathode chamber inlet so said metal is exposed to the contaminated water containing said hydrogen ions for a time sufficient to dissolve a portion of said metal and form metal ions, wherein said metal ions exposed to said hydroxyl ions in said cathode chamber react with said hydroxyl ions to form at least one from the group consisting of a metal hydroxide and a metal hydrous oxide.

2. An apparatus as recited in claim 1, wherein said membrane has a pore size sufficiently large to allow electrically driven ion transfer, wherein said membrane has a pore size sufficiently small to maintain said pH difference.

3. An apparatus as recited in claim 1, wherein said membrane has a pore size capable of providing a pH difference of at least 6 pH units when said voltage is applied between said anode and said cathode and when said flow director is not operating.

4. An apparatus as recited in claim 1, wherein said membrane has a pore size capable of providing less than or equal to pH 4 in said anode chamber when a voltage is applied between said anode and said cathode and when said flow director is not operating.

5. An apparatus as recited in claim 1, wherein said membrane has a pore size capable of providing greater than or equal to pH 10 in said cathode chamber when a voltage is applied between said anode and said cathode and when said flow director is not operating.

6. An apparatus as recited in claim 1, wherein said membrane has a pore size capable of providing a pH difference between said anode and said cathode of approximately 9 pH units when said voltage is applied between said anode and said cathode and when said flow director is not operating.

7. An apparatus as recited in claim 1, wherein said membrane has a pore size capable of providing less than or equal to pH 2 in said anode chamber when a voltage is applied between said anode and said cathode and when said flow director is not operating.

8. An apparatus as recited in claim 1, wherein said membrane has a pore size capable of providing greater than or equal to pH 11 in said cathode chamber when a voltage is applied between said anode and said cathode and when said flow director is not operating.

9. An apparatus as recited in claim 1, wherein said membrane includes a porous material.

10. An apparatus as recited in claim 9, wherein said porous material has multiple pores, wherein said porous material has an average pore size, wherein said average pore size is from 0.5 to 10 micrometers.

11. An apparatus as recited in claim 9, wherein said porous material has multiple pores, wherein said porous material has an average pore size, wherein said pores vary from said average pore size within a range, wherein said range is +/−5% of said average pore size.

12. An apparatus as recited in claim 1, wherein said membrane is made of PTFE.

13. An apparatus as recited in claim 1, wherein said flow director includes one from the group consisting of a pump and a gravity feed flow director.

14. An apparatus as recited in claim 1, wherein when the voltage is applied between said anode and said cathode, hydrogen ions generated in said contaminated water in said anode chamber and flowing with said contaminated water to said cathode chamber and said hydroxyl ions generated in said contaminated water in said cathode chamber provide that water exiting said cathode chamber outlet has substantially the same pH as water entering said anode chamber inlet.

15. An apparatus as recited in claim 1, wherein said metal includes at least one from the group consisting of aluminum and iron.

16. An apparatus as recited in claim 1, further comprising a filter, wherein said filter is located after said cathode chamber outlet to filter the water that flows out of said cathode chamber outlet.

17. An apparatus as recited in claim 16, wherein the contaminated water contains a high molecular weight material, wherein said filter is sized to capture said high molecular weight material adsorbed onto said at least one from the group consisting of said metal hydroxide and said metal hydrous oxide, wherein said high molecular weight material has a molecular weight of at least 200.

18. An apparatus as recited in claim 16, wherein said filter is sized to capture said high molecular weight material adsorbed onto said metal hydroxide or onto said metal hydrous oxide so the water exiting said filter is substantially free of said high molecular weight material.

19. An apparatus as recited in claim 1, wherein the contaminated water further contains a negative ion species, wherein said cathode has a surface capable of catalyzing reaction of said negative ion species with said hydrogen ions and with electrons provided from said cathode.

20. An apparatus as recited in claim 19, wherein said surface is made of a valve metal.

21. An apparatus as recited in claim 20, wherein said surface has a metal selected from the group consisting of titanium, yttrium, zirconium, niobium, hafnium, tantalum, aluminum, and tungsten.

22. An apparatus as recited in claim 19, wherein said negative ion species includes nitrate.

23. An apparatus as recited in claim 22, wherein said reaction produces nitrogen gas and water.

24. An apparatus as recited in claim 1, wherein said anode has an anode surface, wherein said anode surface contains iridium oxide.

25. A method of treating contaminated water, comprising:
 a. providing an electrolytic cell that includes an anode chamber, a cathode chamber, and a membrane, wherein said anode chamber includes an anode, an anode chamber inlet and an anode chamber outlet, and wherein said cathode chamber includes a cathode, a cathode chamber inlet and a cathode chamber outlet, wherein said membrane is configured and positioned in said electrolytic cell to maintain a pH difference between said anode chamber and said cathode chamber when a voltage is applied between said anode and said cathode;
 b. directing the contaminated water into said anode chamber inlet;
 c. directing the water from said anode chamber outlet to said cathode chamber inlet;
 d. providing a voltage between said anode and said cathode sufficient to electrically generate hydrogen ions in the contaminated water at said anode and hydroxyl ions in the water at said cathode, wherein said membrane maintains said pH difference between said anode chamber and said cathode chamber, and wherein the water directed from said anode chamber includes said electrically generated hydrogen ions providing an acidic pH;
 e. providing a holding tank and a metal, wherein said metal is located in said holding tank, wherein said holding tank is located inline between said anode chamber outlet and said cathode chamber inlet so said metal is exposed to the contaminated water containing said hydrogen ions for a time sufficient to dissolve a portion of said metal and form metal ions in the contaminated water, whereinsaid metal ions exposed to said hydroxyl ions react with said hydroxyl ions to form at least one metal oxide from the group consisting of a metal hydroxide and a metal hydrous oxide.

26. A method as recited in claim 25, wherein said metal includes iron, wherein said metal ions include iron ions, and wherein said metal hydrous oxide includes iron hydrous oxide.

27. A method as recited in claim 25, further comprising agglomerating the contaminant in said contaminated water with said at least one metal oxide.

28. A method as recited in claim 25, wherein said contaminant includes at least one from the group consisting of nitrates, phosphates, arsenates, and a high molecular weight material, wherein said high molecular weight material has a molecular weight of at least 200.

29. A method as recited in claim 25, wherein said contaminant includes at least one from the group consisting of negative ion species and heavy molecules.

30. A method as recited in claim 25, wherein said metal includes aluminum, wherein said metal ions include aluminum ions.

31. A method as recited in claim 25, further comprising filtering out particles of the contaminant agglomerated on said metal oxide.

\* \* \* \* \*